US011531552B2

(12) United States Patent
Gupta et al.

(10) Patent No.: US 11,531,552 B2
(45) Date of Patent: Dec. 20, 2022

(54) EXECUTING MULTIPLE PROGRAMS SIMULTANEOUSLY ON A PROCESSOR CORE

(71) Applicant: Microsoft Technology Licensing, LLC, Redmond, WA (US)

(72) Inventors: Gagan Gupta, Bellevue, WA (US); Douglas C. Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/425,632

(22) Filed: Feb. 6, 2017

(65) Prior Publication Data

US 2018/0225124 A1    Aug. 9, 2018

(51) Int. Cl.
*G06F 9/38* (2018.01)
*G06F 9/30* (2018.01)

(52) U.S. Cl.
CPC ........ *G06F 9/3885* (2013.01); *G06F 9/30076* (2013.01); *G06F 9/30189* (2013.01);
(Continued)

(58) Field of Classification Search
CPC .................................................. G06F 9/3885
See application file for complete search history.

(56) References Cited

U.S. PATENT DOCUMENTS 5,615,350 A    3/1997  Hesson
5,790,822 A    8/1998  Sheaffer et al.
(Continued)

FOREIGN PATENT DOCUMENTS

CN    102096579    6/2011
CN    104310225    1/2015
(Continued)

OTHER PUBLICATIONS

Aasaraai, et al., "Design Space Exploration of Instruction Schedulers for Out-of-Order Soft Processors", In Proceedings of the International Conference on Field-Programmable Technology, Dec. 8, 2010, 4 pages.
(Continued)

*Primary Examiner* — John M Lindlof
(74) *Attorney, Agent, or Firm* — Klarquist Sparkman, LLP

(57) ABSTRACT

Systems and methods are disclosed for allocating resources to contexts in block-based processor architectures. In one example of the disclosed technology, a processor is configured to spatially allocate resources between multiple contexts being executed by the processor, including caches, functional units, and register files. In a second example of the disclosed technology, a processor is configured to temporally allocate resources between multiple contexts, for example, on a clock cycle basis, including caches, register files, and branch predictors. Each context is guaranteed access to its allocated resources to avoid starvation from contexts competing for resources of the processor. A results buffer can be used for folding larger instruction blocks into portions that can be mapped to smaller-sized instruction windows. The results buffer stores operand results that can be passed to subsequent portions of an instruction block.

20 Claims, 15 Drawing Sheets

(52) U.S. Cl.
CPC .......... *G06F 9/3814* (2013.01); *G06F 9/3851* (2013.01); *G06F 9/3891* (2013.01)

(56) References Cited

U.S. PATENT DOCUMENTS

| | | | |
|---|---|---|---|
| 5,796,997 A | 8/1998 | Lesartre et al. | |
| 5,845,103 A | 12/1998 | Sodani et al. | |
| 5,943,501 A | 8/1999 | Burger et al. | |
| 6,016,399 A | 1/2000 | Chang | |
| 6,061,776 A | 5/2000 | Burger et al. | |
| 6,161,170 A | 12/2000 | Burger et al. | |
| 6,164,841 A | 12/2000 | Mattson et al. | |
| 6,275,919 B1 | 8/2001 | Johnson | |
| 6,279,101 B1* | 8/2001 | Witt | G06F 9/3836 712/215 |
| 6,301,673 B1 | 10/2001 | Foster et al. | |
| 6,453,344 B1 | 9/2002 | Ellsworth et al. | |
| 6,493,820 B2 | 12/2002 | Akkary et al. | |
| 6,529,922 B1 | 3/2003 | Hoge | |
| 6,877,059 B2 | 4/2005 | Solomon et al. | |
| 6,918,032 B1 | 7/2005 | Abdallah et al. | |
| 6,934,254 B2 | 8/2005 | Brown et al. | |
| 6,957,435 B2 | 10/2005 | Armstrong et al. | |
| 6,965,969 B2 | 11/2005 | Burger et al. | |
| 6,988,183 B1 | 1/2006 | Wong | |
| 6,993,640 B2 | 1/2006 | Doing et al. | |
| 6,996,698 B2 | 2/2006 | Slegal et al. | |
| 7,032,217 B2 | 4/2006 | Wu | |
| 7,036,036 B2 | 4/2006 | Vorbach et al. | |
| 7,051,188 B1 | 5/2006 | Kubala et al. | |
| 7,051,329 B1* | 5/2006 | Boggs | G06F 9/30123 712/E9.027 |
| 7,228,402 B2 | 6/2007 | Rychlik et al. | |
| 7,284,100 B2 | 10/2007 | Slegal et al. | |
| 7,299,458 B2 | 11/2007 | Hammes | |
| 7,380,038 B2 | 5/2008 | Gray | |
| 7,392,524 B2 | 6/2008 | Ault et al. | |
| 7,526,637 B2 | 4/2009 | Jung et al. | |
| 7,587,578 B2 | 9/2009 | Isobe | |
| 7,664,940 B2 | 2/2010 | Conklin et al. | |
| 7,676,650 B2 | 3/2010 | Ukai | |
| 7,685,354 B1 | 3/2010 | Hetherington et al. | |
| 7,802,073 B1 | 9/2010 | Cheng et al. | |
| 7,853,777 B2 | 12/2010 | Jones et al. | |
| 7,873,776 B2 | 1/2011 | Hetherington et al. | |
| 7,877,580 B2 | 1/2011 | Eickemeyer et al. | |
| 7,917,733 B2 | 3/2011 | Kazuma | |
| 8,055,881 B2 | 11/2011 | Burger et al. | |
| 8,055,885 B2 | 11/2011 | Nakashima | |
| 8,127,119 B2 | 2/2012 | Burger et al. | |
| 8,166,282 B2 | 4/2012 | Madriles et al. | |
| 8,180,997 B2 | 5/2012 | Burger et al. | |
| 8,201,024 B2 | 6/2012 | Burger et al. | |
| 8,225,315 B1 | 7/2012 | Cheng et al. | |
| 8,250,555 B1 | 8/2012 | Lee et al. | |
| 8,321,850 B2 | 11/2012 | Bruening et al. | |
| 8,341,639 B2 | 12/2012 | Lewis | |
| 8,433,885 B2 | 4/2013 | Burger et al. | |
| 8,447,911 B2 | 5/2013 | Burger et al. | |
| 8,464,002 B2 | 6/2013 | Burger et al. | |
| 8,490,107 B2 | 7/2013 | Jalal et al. | |
| 8,544,014 B2 | 9/2013 | Gopalan et al. | |
| 8,817,793 B2 | 8/2014 | Mushano | |
| 9,021,241 B2 | 4/2015 | Burger et al. | |
| 9,043,769 B2 | 5/2015 | Vorbach | |
| 9,053,292 B2 | 6/2015 | Abdallah | |
| 9,135,079 B2 | 9/2015 | Flemming et al. | |
| 10,303,514 B2* | 5/2019 | Snyder, II | G06F 9/5011 |
| 2003/0012225 A1 | 1/2003 | Banerjee et al. | |
| 2003/0061260 A1* | 3/2003 | Rajkumar | G06F 9/4887 718/104 |
| 2003/0065835 A1 | 4/2003 | Maergner et al. | |
| 2004/0163082 A1 | 8/2004 | Tremblay et al. | |
| 2004/0193855 A1* | 9/2004 | Kacevas | G06F 9/3844 712/237 |
| 2004/0216120 A1 | 10/2004 | Burky et al. | |
| 2006/0020769 A1 | 1/2006 | Herrell et al. | |
| 2006/0020944 A1 | 1/2006 | King et al. | |
| 2006/0031702 A1 | 2/2006 | Jardine et al. | |
| 2006/0075207 A1 | 4/2006 | Togawa et al. | |
| 2006/0282624 A1 | 12/2006 | Yakota | |
| 2007/0055827 A1 | 3/2007 | Tsien | |
| 2007/0074011 A1 | 3/2007 | Borkar et al. | |
| 2007/0162906 A1 | 7/2007 | Chandhoke | |
| 2007/0239965 A1 | 8/2007 | Lewites et al. | |
| 2008/0046621 A1 | 2/2008 | Okino et al. | |
| 2008/0126750 A1 | 5/2008 | Sistla | |
| 2009/0013135 A1 | 1/2009 | Burger et al. | |
| 2009/0013153 A1 | 1/2009 | Hilton | |
| 2009/0013160 A1 | 1/2009 | Burger et al. | |
| 2009/0177843 A1 | 7/2009 | Wallach et al. | |
| 2010/0146209 A1 | 6/2010 | Burger et al. | |
| 2010/0325395 A1 | 12/2010 | Burger et al. | |
| 2011/0060889 A1 | 3/2011 | Burger et al. | |
| 2011/0072239 A1 | 3/2011 | Burger et al. | |
| 2011/0078424 A1 | 3/2011 | Boehm et al. | |
| 2011/0093861 A1 | 4/2011 | Flemming et al. | |
| 2011/0265068 A1 | 10/2011 | Elnozahy et al. | |
| 2012/0079503 A1* | 3/2012 | Dally | G06F 9/3851 718/108 |
| 2012/0246450 A1 | 9/2012 | Abdallah | |
| 2012/0303933 A1 | 11/2012 | Manet et al. | |
| 2012/0311306 A1 | 12/2012 | Mushano | |
| 2013/0089635 A1 | 4/2013 | Davidson et al. | |
| 2013/0198499 A1 | 8/2013 | Dice et al. | |
| 2013/0290675 A1* | 10/2013 | Chou | G06F 9/30043 712/205 |
| 2013/0339470 A1 | 12/2013 | Jeswani et al. | |
| 2014/0089635 A1 | 3/2014 | Shifer et al. | |
| 2014/0095837 A1 | 4/2014 | Plotnikov et al. | |
| 2014/0181475 A1 | 6/2014 | Abdallah | |
| 2014/0281424 A1 | 9/2014 | Bobba et al. | |
| 2014/0298336 A1 | 10/2014 | Taniuchi | |
| 2014/0372736 A1 | 12/2014 | Greenhalgh | |
| 2015/0067214 A1 | 3/2015 | Henry et al. | |
| 2015/0067662 A1 | 3/2015 | Palalau | |
| 2015/0100757 A1 | 4/2015 | Burger et al. | |
| 2015/0127928 A1* | 5/2015 | Burger | G06F 9/3836 712/229 |
| 2015/0199199 A1 | 7/2015 | Burger et al. | |
| 2016/0055004 A1 | 2/2016 | Grochowski et al. | |
| 2016/0092230 A1* | 3/2016 | Chen | G06F 9/30065 712/241 |
| 2016/0140686 A1 | 5/2016 | Lueh et al. | |
| 2016/0170767 A1* | 6/2016 | Gendler | G06F 9/3851 712/225 |
| 2016/0202989 A1* | 7/2016 | Eisen | G06F 9/3851 712/215 |
| 2016/0216995 A1 | 7/2016 | Cropper et al. | |
| 2016/0259645 A1 | 9/2016 | Wright | |
| 2016/0357647 A1 | 12/2016 | Shirai et al. | |
| 2016/0378661 A1* | 12/2016 | Gray | G06F 9/3846 712/237 |
| 2017/0083313 A1 | 3/2017 | Sankaralingam et al. | |
| 2017/0083315 A1 | 3/2017 | Burger et al. | |
| 2017/0083316 A1 | 3/2017 | Burger et al. | |
| 2017/0083334 A1 | 3/2017 | Burger et al. | |

FOREIGN PATENT DOCUMENTS

| | | |
|---|---|---|
| WO | WO 2009/006607 | 1/2009 |
| WO | WO 2014/193878 | 12/2014 |
| WO | 2016126880 A1 | 8/2016 |

OTHER PUBLICATIONS

Anderson, "A Framework for Composing High-Performance OpenCL from Python Descriptions", In Technical Report of UCB/EECS-2014-210, Dec. 5, 2014, 144 pages.

Bakhoda, et al., "E2", Published on: Jun. 19, 2013, Retrieved on: Oct. 4, 2015; http://research.microsoft.com/en-us/projects/e2/, 2 pages.

(56) References Cited

OTHER PUBLICATIONS

Bouwens et al., "Architecture Enhancements for the ADRES Coarse-Grained Reconfigurable Array," High Performance Embedded Architectures and Compilers, Springer Berlin Heidelberg pp. 66-81 (2008).
Bulpin, James R., "Operating system support for simultaneous multithreaded processors", In Technical Report, No. 619, Feb. 2005, pp. 1-130.
Burger et al., "Design and Implementation of the TRIPS EDGE Architecture", In Proceedings of the 32nd Annual International Symposium on Computer Architecture, Jun. 4, 2005, pp. 1-41.
Burger et al., "Scaling to the End of Silicon with EDGE Architectures," In Proceedings of Computer, vol. 37, Issue 7, Jul. 1, 2004, pp. 44-55.
Carli, "Flexible MIPS Soft Processor Architecture", In Technical Report of Massachusetts Institute of Technology, Jun. 18, 2008, pp. 1-49.
Chang, et al., "Cooperative Caching for Chip Multiprocessors", In Proceedings of the 33rd annual international symposium on Computer Architecture, Jun. 17, 2006, 12 pages.
Cheah, et al., "Analysis and Optimization of a Deeply Pipelined FPGA Soft Processor", In Proceedings of International Conference on Field-Programmable Technology, Dec. 10, 2014, 4 pages.
Choudhury, "Visualizing Program Memory Behavior Using Memory Reference Traces", In Ph.D. Thesis of University of Utah, Aug. 2012, 158 pages.
Coons et al., "Feature Selection for Instruction Placement in an EDGE Architecture," Mar. 17, 2007, 6 pages.
Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.
Desikan et al., "Scalable Selective Re-Execution for EDGE Architectures," In Proceedings of the 11th International Conference on Architectural Support for Programming Languages and Operating Systems, Oct. 9, 2004, 13 pages.
Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.
Duric et al., "EVX: Vector Execution on Low Power EDGE Cores," Design, Automation and Test in European Conference and Exhibition, Mar. 24-28, 2014, 4 pages.
Duric et al., "ReCompAc: Reconfigurable compute accelerator," IEEE 2013 International Conference on Reconfigurable Computing and FPGAS (Reconfig), Dec. 9, 2013, 4 pages.
"Explicit Data Graph Execution", Retrieved on: Aug. 6, 2015, Available at: https://en.wikipedia.org/wiki/Explicit_Data_Graph_Execution.
Fallin, et al., "The Heterogeneous Block Architecture", In Proceedings of 32nd IEEE International Conference on Computer Design, Oct. 19, 2014, pp. 1-8.
Gebhart et al., "An Evaluation of the TRIPS Computer System," In Proceedings of the 14th international conference on Architectural support for programming languages and operating systems, Mar. 7, 2009, 12 pages.
Govindan, "E3:Energy-Efficient EDGE Architectures", In Dissertation, Aug. 2010, 244 pages.
Govindan et al., "Scaling Power and Performance via Processor Composability," IEEE Transaction on Computers, No. 1, Aug. 2014, 14 pages.
Govindaraju et al., "DySER: Unifying Functionality and Parallelism Specialization for Energy-Efficient Computing," IEEE Micro, IEEE Service Center, Sep. 1, 2012, 14 pages.
Gray, "GRVI Phalanx: A Massively Parallel RISC-V FPGA Accelerator Accelerator," 24th IEEE Symposium on Field-Programmable Custom Computing Machines (FCCM 2016), May 1, 2016, 4 pages.
Gray and Smith, "Towards an Area-Efficient Implementation of a High ILP EDGE Soft Processor: Comparing Out-of-Order Dataflow Instruction Scheduler Designs," poster temporarily on display during The 22nd IEEE International Symposium on Field-Programmable Custom Computing Machines May 11-13, 2014, Boston, Massachusetts (poster on display for approximately 1-2 hours, and less than one day, May 2014).
Gulati, et al., " Multitasking Workload Scheduling on Flexible Core Chip Multiprocessors", In Proceedings of the Computer Architecture News, vol. 36, Issue 2, May 2008, 10 pages.
Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Hayes et al., "Unified On-chip Memory Allocation for SIMT Architecture", In Proceedings of the 28th ACM international conference on Supercomputing, Jun. 10, 2014, pp. 293-302.
Hruska, "VISC CPU 'virtual core' design emerges: Could this be the conceptual computing breakthrough we've been waiting for?", Published on: Oct. 24, 2014, Available at: http://www.extremetech.com/extreme/192858-visc-cpu-virtual-core-design-emerges-could-this-be-the-conceptual-breakthrough-weve-been-waiting-for.
Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).
Huang, "Improving Processor Performance Through Compiler-Assisted Block Reuse," In Doctoral Dissertation, May 2000, 125 pages.
"Intel® 64 Architecture Processor Topology Enumeration", In White Paper of Intel, Dec. 13, 2013, pp. 1-29.
Ipek et al., "Core Fusion: Accommodating Software Diversity in Chip Multiprocessors", In Proceedings of the 34th annual international symposium on Computer architecture, Jun. 9, 2007, 12 pages.
Jain et al., "DeCO: A DSP Block Based FPGA Accelerator Overlay with Low Overhead Interconnect," 24th IEEE Symposium on Field-Programmable Custom Computing Machines (FCCM 2016), May 1, 2016, 8 pages.
Kamaraj, et al., "Design of Out-Of-Order Superscalar Processor with Speculative Thread Level Parallelism", In Proceedings of International Conference on Innovations in Engineering and Technology, Mar. 21, 2014, pp. 1473-1478.
Kavi, et al., "Concurrency, Synchronization, Speculation—the Dataflow Way", In Journal of Advances in Computers, vol. 96, Nov. 23, 2013, pp. 1-41.
Keckler et al., "Tera-Op Reliable Intelligently Adaptive Processing System (Trips)," In AFRL-IF-WP-TR-2004-1514, document dated Apr. 2004, 29 Pages.
Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).
Kinsy et al., "Heracles: A Tool for Fast RTL-Based Design Space Exploration of Multicore Processors", In Proceedings of the ACM/SIGDA international symposium on Field programmable gate arrays, Feb. 11, 2013, pp. 125-134.
Kozumplik, et al., "TRIPS to the Semantic EDGE", Retrieved on: Sep. 22, 2015, Available at: http://vbn.aau.dk/ws/files/61072300/1212050422.pdf.
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Liu, "Hardware Techniques to Improve Cache Efficiency", In Dissertation of the University of Texas at Austin, May 2009, 189 pages.
Mackerras, Paul, "KVM on IBM Power8 machines", https://www.linux-kvm.org/images/7/77/01x09a-KVMPower.pdf, Published on: Oct. 15, 2016, 1-16 pages.

(56) References Cited

OTHER PUBLICATIONS

Maher, "Atomic Block Formation for Explicit Data Graph Execution Architectures", In Dissertation of Doctor of Philosophy, Aug. 2010, 185 pages.
Maher et al., "Merging Head and Tail Duplication for Convergent Hyperblock Formation," In Annual IEEE/ACM International Symposium on Microarchitecture, Dec. 2006, 12 pages.
Masti, et al., "Logical Partitions on Many-Core Platforms", In Proceedings of 31st Annual Computer Security Applications Conference, Dec. 7, 2015, 10 pages.
Mcdonald et al., "Characterization of TCC on Chip-Multiprocessors," Parallel Architectures and Compilation Techniques, 2005. PACT 2005. 14th International Conference on. IEEE, 2005, 12 pages.
Mcdonald et al., "TRIPS Processor Reference Manual," In Technical Report TR-05-19, document marked Mar. 10, 2005, 194 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Munshi, et al., "A Parameterizable SIMD Stream Processor", In Proceedings of Canadian Conference on Electrical and Computer Engineering, May 1, 2005, pp. 806-811.
Muraoka et al., "VCore-based design methodology", In Proceedings of the Asia and South Pacific Design Automation Conference, Jan. 21, 2003, pp. 441-445.
Nagarajan et al., "Critical Path Analysis of the TRIPS Architecture," In IEEE International Symposium on Performance Analysis of Systems and Software, Mar. 19, 2006, 11 pages.
Nagarajan et al., "A Design Space Evaluation of Grid Processor Architectures," In Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.
"Oracle Partitioning Policy", https://web.archive.org/web/20121002232533/http:/www.oracle.com/us/corporate/pricing/partitioning-070609.pdf, Published on: Oct. 2, 2012, 4 pages.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Pengfei et al., "M5 Based EDGE Architecture Modeling", In Proceedings of IEEE International Conference on Computer Design, Oct. 3, 2010, pp. 289-296.
Pierce et al., "Wrong-Path Instruction Prefetching", In Proceedings of the 29th Annual IEEE/ACM International Symposium on Microarchitecture, Dec. 2, 1996, pp. 1-17.
"Programmatic API for Building Resources," Published on: Nov. 3, 2014; Available at: https://jersey.java.net/documentation/latest/resource-builder.html.
Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).
Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Roesner, "Counting Dependence Predictors," In Undergraduate Honors Thesis, May 2, 2008, 25 pages.
Rouse, Margaret, "logical partition (LPAR)", http://whatis.techtarget.com/definition/logical-partition-LPAR, Published on: Mar. 2011, 10 pages.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sankaralingam, "Polymorphous Architectures: A Unified Approach for Extracting Concurrency of Different Granularities", In Doctoral Dissertation of Philosophy, Aug. 2007, 276 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sarkar et al., "Understanding POWER Multiprocessors", In Proceedings of the 32nd ACM SIGPLAN Conference on Programming Language Design and Implementation, Jun. 4, 2011, pp. 175-186.
Sethumadhavan et al., "Design and Implementation of the TRIPS Primary Memory System," In Proceedings of International Conference on Computer Design, Oct. 1, 2006, 7 pages.
Sibi et al., "Scaling Power and Performance via Processor Composability," University of Texas at Austin technical report No. TR-10-14 (2010), 20 pages.
Singhal, Ronak, "Inside Intel Next Generation Nehalem Micro architecture", http://www.cs.uml.edu/~bill/cs515/Intel_Nehalem_Processor.pdf, Retrieved on: Oct. 7, 2016, pp. 1-165.
Sleiman, et al., "Efficiently Scaling Out-of-Order Cores for Simultaneous Multithreading", In Proceedings of 43rd International Symposium on Computer Architecture, Jun. 18, 2016, 13 pages.
Smith et al., "Compiling for EDGE Architectures," In Proceedings of International Symposium on Code Generation and Optimization, Mar. 26, 2006, 11 pages.
Smith et al., "Dataflow Predication", In Proceedings of 39th Annual IEEE/ACM International Symposium on Microarchitecture, Dec. 9, 2006, 12 pages.
Smith, "Explicit Data Graph Compilation," In Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Sohi et al., "Multiscalar Processors," In Proceedings of 22nd Annual International Symposium on Computer Architecture, Jun. 22-24, 1995, 12 pages.
Sohi, "Retrospective: multiscalar processors," In Proceedings of The 25th Annual International Symposium on Computer Architectures, Jun. 27-Jul. 1, 1998, pp. 1111-1114.
Souza et al., "Dynamically Scheduling VLIW Instructions", In Journal of Parallel and Distributed Computing, vol. 60, Jul. 2000, pp. 1480-1511.
Tamches et al., "Dynamic Kernel Code Optimization," In Workshop on Binary Translation, 2001, 10 pages.
Ueno, et al., "System Performance Improvement By Server Virtualization", In Proceedings of World Congress on Engineering, Jul. 6, 2011, 6 pages.
Uheig, "Trap-driven Memory Simulation," In Doctoral Dissertation of Ph.D., Aug. 1995, 203 pages.
Wong, et al., "Efficient Methods for Out-of-Order Load/Store Execution for High-Performance soft Processors", In Proceedings of International Conference on Field-Programmable Technology, Dec. 9, 2013, pp. 442-445.

(56) References Cited

OTHER PUBLICATIONS

Wong et al., "High Performance Instruction Scheduling Circuits for Out-of-Order Soft Processors," 24th IEEE Symposium on Field-Programmable Custom Computing Machines (FCCM 2016), May 1, 2016, 8 pages.
Wu et al., "Block Based Fetch Engine for Superscalar Processors", In Proceedings of the 15th International Conference on Computer Applications in Industry and Engineering, Nov. 7, 2002, 4 pages.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
"International Search Report and Written Opinion Issued in PCT application No. PCT/US2018/015816", dated May 8, 2018, 19 Pages.
Robatmili et al., Strategies for mapping dataflow blocks to distributed hardware, 2008 41st IEEE/ACM International Symposium on Microarchitecture, Nov. 2008, pp. 23-34.
"Office Action Issued in European Patent Application No. 18704754. 3", dated Mar. 29, 2021, 7 Pages.
"Office Action Issued in Indian Patent Application No. 201947029293", dated Jan. 5, 2022, 5 Pages.

\* cited by examiner

EXECUTING MULTIPLE PROGRAMS SIMULTANEOUSLY ON A PROCESSOR CORE

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for processors, including those having block-based processor instruction set architecture (BB-ISA), to execute instructions using a variable number of allocated resources. For example, an Explicit Data Graph Execution (EDGE) ISA processor can allocate all of its assignable resources to a single execution context, or divide the assigned resources amongst two or more contexts, achieving higher throughput and/or resource utilization.

The described techniques and tools can potentially improve processor performance and can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, touch screen tablet devices, tablet computers, wearable computers, and laptop computers.

In some examples of the disclosed technology, a processor includes a block-based processor core that can have its resources spatially and/or temporally allocated between contexts (e.g., processes or threads). Instruction block portions can be folded to map to instruction windows smaller than the instruction block using a results buffer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

DETAILED DESCRIPTION

I. General Considerations

Figure 1:
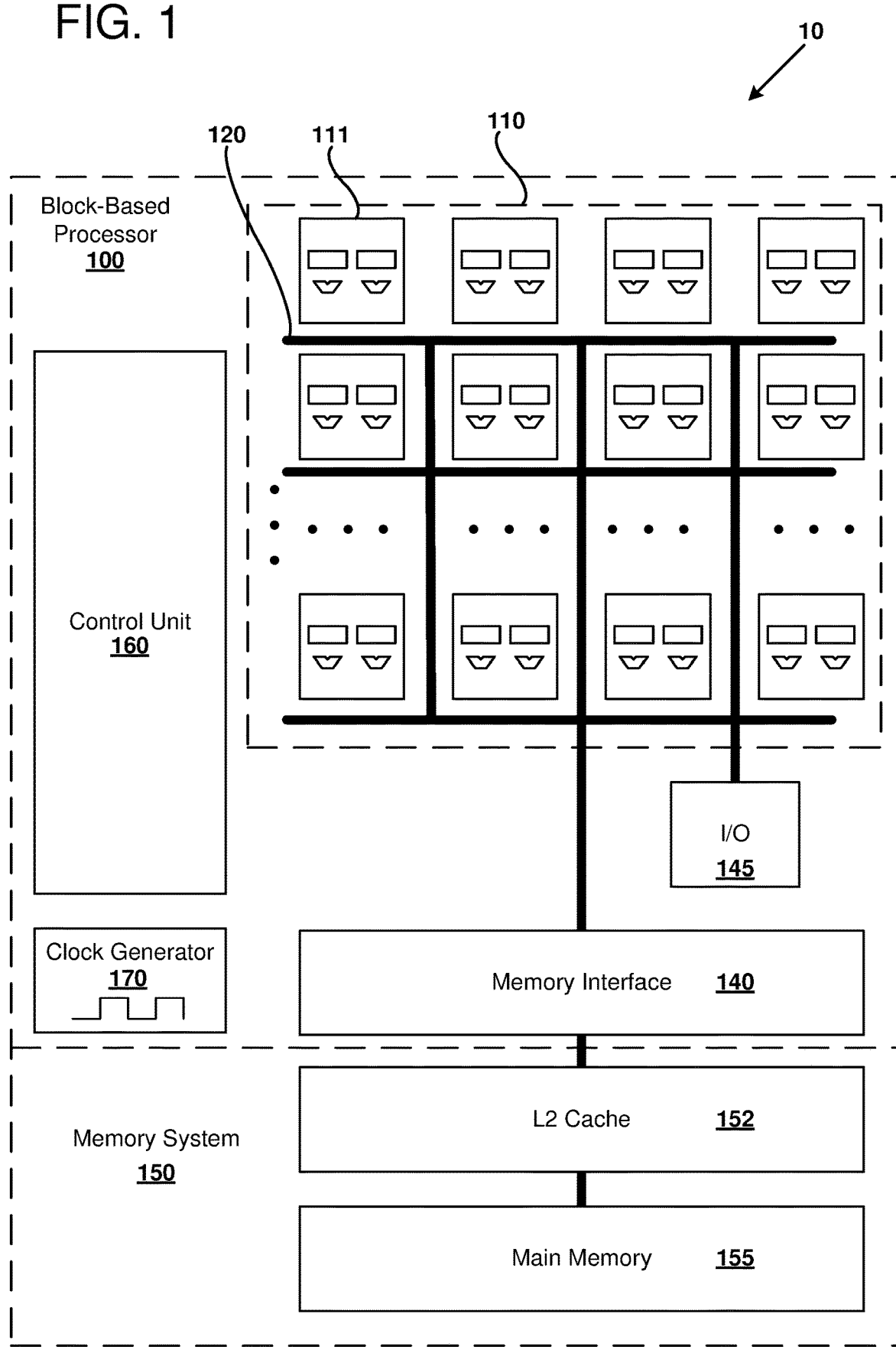
FIG. 1 illustrates a block-based processor including multiple processor cores, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block-based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive energy-consuming circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize energy efficiency and/or performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor comprising multiple processor cores uses an Explicit Data Graph Execution (EDGE) ISA designed for area- and energy-efficient, high-ILP execution. In some examples, use of EDGE architectures and associated compilers finesses away much of the register renaming, CAMs, and complexity. In some examples, the respective cores of the block-based processor can store or cache fetched and decoded instructions that may be repeatedly executed, and the fetched and decoded instructions can be reused to potentially achieve reduced power and/or increased performance.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Within an instruction block, instructions directly communicate results to consuming instructions through operand buffers. Across blocks, results are communicated through named registers. Intermediate results produced by the instructions within an atomic instruction block that affect the architectural state are buffered locally until the instruction block is committed. When the instruction block is committed, updates to the visible architectural state resulting from executing the instructions of the instruction block are made visible to other instruction blocks. Instructions inside blocks execute in dataflow order, which reduces or eliminates using register renaming and provides power-efficient OoO execution. In current process technologies, a typical BB-ISA design may support up to 128-instruction blocks. The block size can influence processor performance, but in general, larger blocks up to a certain size (e.g., 128- or 256-word blocks) are preferred using current process technologies. A program's characteristics, among other factors, can influence the optimum instruction block size.

On occasion, a program may not have instruction-level parallelism (ILP) to keep the processor's execution resources fully utilized. Execution resources include processor hardware that can be allocated to a particular context for a process or thread on a spatial or temporal basis. Spatially allocated execution resources are exclusively allocated to its allocated context for a period of time on a predetermined basis. Thus, unlike other approaches where resources may be used by a thread until the thread is blocked or waiting, and then assigned to another thread, the spatially allocated execution resources provide exclusive access to the associated context for the duration of allocation. Temporally allocated execution resources are allocated between two or more contexts on a predetermined basis, but shared in time. For example, a first context may have access to a temporally allocated execution resource for all odd clock cycles, and a second context may have access to the temporally allocated execution resources for all even clock cycles. More complex temporal allocation schemes can be used, but the scheme is selected a priori to allocation of the resource.

Examples of execution resources that can be spatially allocated to a context include an instruction window, a functional unit, a data cache, an instruction cache, a results buffer, or a physical register file. Examples of execution resources that can be temporally allocated to a context include: a branch predictor, an instruction cache, or a data cache. Any suitable combination of these exemplary execution resources can be spatially or temporally allocated.

The execution resources can be logically divided among multiple "contexts." Each context comprises architectural state data for a process or thread hosted by the processor. For example, architectural state data associated with an individual context for a process or thread can include priority information for the associated process or thread, scheduling information for the associated process or thread, child/parent process information, interprocess communication data, privilege information, state information, identifiers for the process or thread, architectural register file values, instruction block address pointers, individual instruction pointers within an instruction block, memory management information, or other suitable information associated with a process or thread.

By allocating each context a subset of resources, multiple contexts can now execute simultaneously. This scheme effectively breaks the processor into multiple smaller processors, colloquially dubbed "core fission." Core fission can be performed by dynamically allocating resources, spatially and/or temporally, at run-time. The processor may switch from a default "large" core, where all the resources are allocated to a single context, to "little" cores, where portions of the resources are each disjointly allocated to two or more contexts. The allocation of resources can be controlled by an operating system, by the program itself, or autonomously by control circuitry of the processor.

As will be discussed further below, certain examples of disclosed processor cores can be partitioned and assigned to one, two, three, four, or more contexts. The subset of resources can be spatially allocated, where the portions of the resources are allocated to a context in a fixed manner that does not vary during the period when the resources are allocated. The subset of resources can be temporally allocated (time-based allocation), where the portions of the resources are allocated between two or more contexts for fixed time periods. For example, a first context may access a portion of the resources every even clock cycle and a second context may access a portion of the resources every odd clock cycle. In some examples, some of the resources of the processor are allocated spatially, while other resources are allocated in a temporal fashion. For example, half of a set of spatially-allocated resources can be allocated to a first context, including an instruction cache, an instruction window, a functional unit, and a register file, with the remainder being allocated to a second context. Half of a set of temporally-allocated resources can be allocated to the first context, including a branch predictor, a data cache, and an instruction decoder, where the first context accesses the temporally-allocated resources during designated clock cycles and the second context is allocated the resources during the clock cycles not designated for the first context. As will be readily ascertained by one of ordinary skill in the art having the benefit of the present disclosure, allocating resources according to the disclosed examples can provide a predetermined amount of resources to each of the allocated contexts, and avoid issues with other approaches that wait for an execution thread to become starved or stalled before allocating resources to other threads. Further, the spatial and temporal allocation schemes can reduce control resources used to implement allocation by allocating the resources on a pre-determined basis instead of a run-time basis, which may be less predictable and more susceptible to variations induced by data and other variations in input to a thread.

A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using visible architectural state such as memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

In some examples of the disclosed technology, a next block predictor can be used to predict an address of the next block of instructions to be executed. The predicted address can be used to speculatively fetch or decode the subsequent block to minimize delays in executing subsequent blocks. The next block predictor can accept as input, one or more of the following: a block address of an executing instruction block, a block address of a target instruction block, whether one or more branch instructions of the instruction block are taken or not taken, hints encoded in instruction block headers, and/or a context identifier (e.g., an identifier assigned to a process or thread). The next block predictor produces one or more predicted target addresses as an output. In some examples, a confidence level is provided for one or more of the target addresses.

In some examples, memory can be loaded or stored speculatively. For example, a memory load/store queue can be used to route memory access performed by instructions, thereby minimizing delays in fetching and storing data in memory. In some examples, instruction-level parallelism can be exploited to execute multiple instructions within a block in parallel. In some examples of the disclosed technology, a BB-ISA exposes details of instruction block size and load-store queue size to the programmer, allowing for improved optimization (by a manual programmer or by a compiler).

As will be readily understood to one of ordinary skill in the relevant art, a spectrum of implementations of the disclosed technology are possible with various area, performance, and power tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1 an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface 140 can include a memory management unit (MMU) for managing and allocating virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit can communicate with the processing cores 110, the I/O interface 145, and the memory interface 140 via the core interconnect 120 or a side-band interconnect (not shown). The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can also process hardware interrupts, and control reading and writing of special system registers, for example the program counter (instruction block address register) stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler that is used to allocate instruction blocks to the processor cores 110. As used herein, scheduler allocation refers to hardware for directing operation of instruction blocks, including initiating instruction block mapping, fetching, decoding, execution, committing, aborting, idling, and refreshing an instruction block. In some examples, the hardware receives signals generated using computer-executable instructions to direct operation of the instruction scheduler. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The control unit 160 can further be used to allocated functional resources within the processor cores to contexts. For example, instruction cache, instruction windows, functional units, register files, branch predictors (next block predictors), and/or data cache can be allocated by the control unit 160.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allow power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
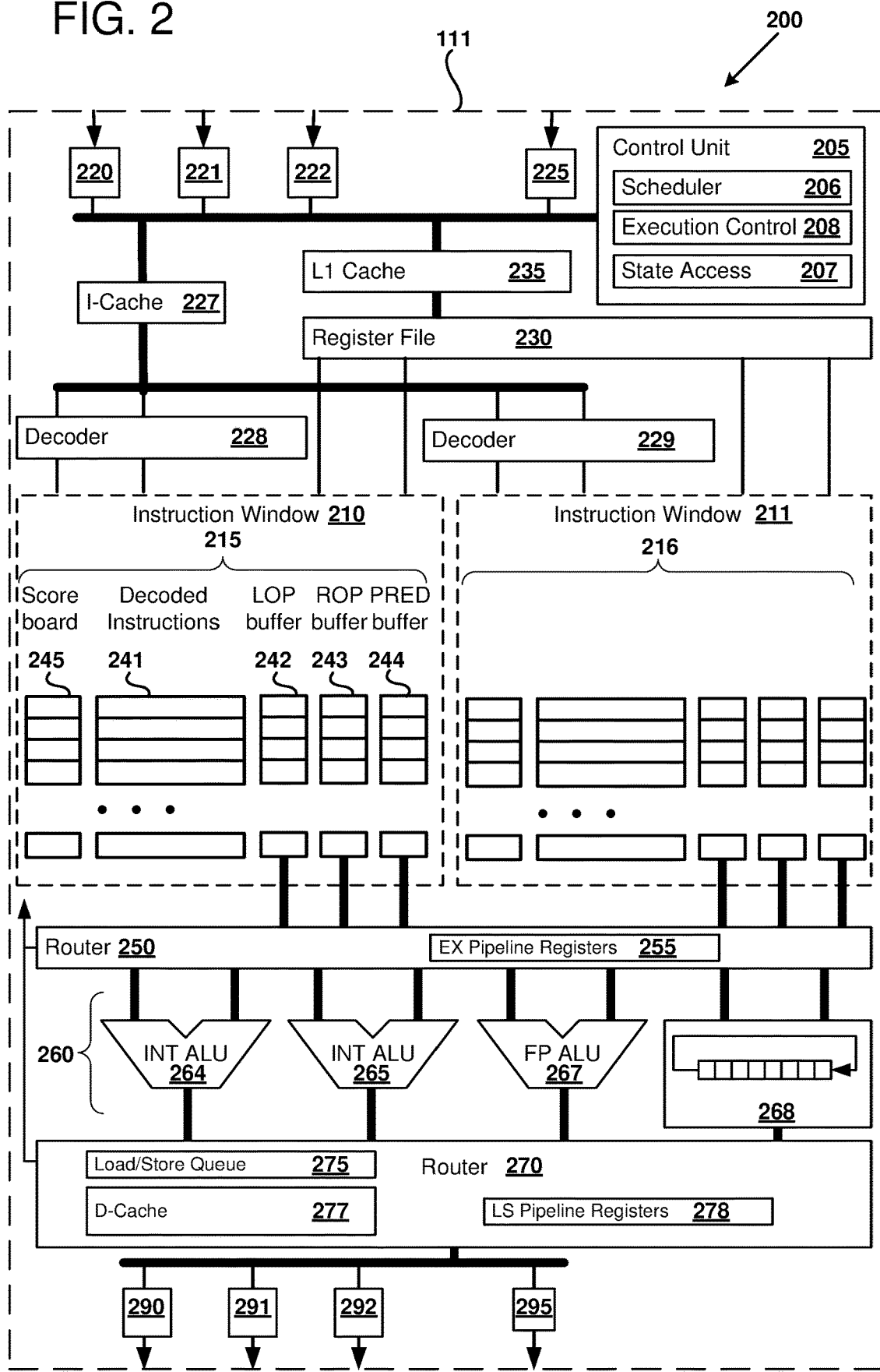
FIG. 2 illustrates a block-based processor core, as can be used in some examples of the disclosed technology.

FIG. 2 is a block diagram 200 further detailing an example microarchitecture for the block-based processor 100, and in particular, an instance of one of the block-based processor cores (processor core 111), as can be used in certain examples of the disclosed technology. For ease of explanation, the exemplary block-based processor core 111 is illustrated with five stages: instruction fetch (IF), decode (DC), operand fetch, execute (EX), and memory/data access (LS). However, as will be readily understood by one of ordinary skill in the relevant art having the benefit of the present disclosure, modifications to the illustrated microarchitecture, such as adding/removing stages, adding/removing units that perform operations, and other implementation details can be adapted to suit a particular application for a block-based processor.

In some examples of the disclosed technology, the processor core 111 can be used to execute and commit an instruction block of a program. An instruction block is an atomic collection of block-based-processor instructions that includes an instruction block header and a plurality of instructions. As will be discussed further below, the instruction block header can include information describing an execution mode of the instruction block and information that can be used to further define semantics of one or more of the plurality of instructions within the instruction block. Depending on the particular ISA and processor hardware used, the instruction block header can also be used, during execution of the instructions, to improve performance of executing an instruction block by, for example, allowing for early fetching of instructions and/or data, improved branch prediction, speculative execution, improved energy efficiency, and improved code compactness.

The instructions of the instruction block can be dataflow instructions that explicitly encode relationships between producer-consumer instructions of the instruction block. In particular, an instruction can communicate a result directly to a targeted instruction through an operand buffer that is reserved only for the targeted instruction. The intermediate results stored in the operand buffers are generally not visible to cores outside of the executing core because the block-atomic execution model only passes final results between the instruction blocks. The final results from executing the instructions of the atomic instruction block are made visible outside of the executing core when the instruction block is committed. Thus, the visible architectural state generated by each instruction block can appear as a single transaction outside of the executing core, and the intermediate results are typically not observable outside of the executing core. However, a programmer may find the intermediate results useful when debugging a program running on a block-based processor. As described herein, the processor core 111 can include a debug mode where the intermediate results can be observed outside of the executing core by using a data-path reserved exclusively for debugging.

As shown in FIG. 2, the processor core 111 includes a control unit 205, which can receive control signals from other cores and generate control signals to regulate core operation and schedules the flow of instructions within the core using an instruction scheduler 206. The control unit 205 can include state access logic 207 for examining core status and/or configuring operating modes of the processor core 111. The control unit 205 can include execution control logic 208 for generating control signals during one or more operating modes of the processor core 111. Operations that can be performed by the control unit 205 and/or instruction scheduler 206 can include allocation and de-allocation of cores for performing instruction processing, control of input data and output data between any of the cores, register files, the memory interface 140, and/or the I/O interface 145. The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205, instruction scheduler 206, state access logic 207, and/or execution control logic 208 are implemented at least in part using one or more of: hardwired finite state machines, programmable microcode, programmable gate arrays, or other suitable control circuits.

The control unit 205 can decode the instruction block header to obtain information about the instruction block. For example, execution modes of the instruction block can be specified in the instruction block header though various execution flags. The decoded execution mode can be stored in registers of the execution control logic 208. Based on the execution mode, the execution control logic 208 can generate control signals to regulate core operation and schedule the flow of instructions within the core 111, such as by using the instruction scheduler 206. For example, during a default execution mode, the execution control logic 208 can sequence the instructions of one or more instruction blocks executing on one or more instruction windows (e.g., 210, 211) of the processor core 111. Specifically, each of the instructions can be sequenced through the instruction fetch, decode, operand fetch, execute, and memory/data access stages so that the instructions of an instruction block can be pipelined and executed in parallel. The instructions are ready to execute when their operands are available, and the instruction scheduler 206 can select the order in which to execute the instructions. An instruction can receive its operands from the register file or other preceding instructions. An instruction's results can be sent to other target instructions within the instruction block or to the register file. One or more instructions within an instruction window can be examined concurrently to determine which instructions of an instruction block are ready for execution.

As another example, during a debug execution mode, the execution control logic 208 can single-step the instructions of an instruction block executing on one or more instruction windows of the processor core 111. Specifically, each of the instructions can be sequenced through the instruction fetch and decode stages, and each of the instructions can be executed one instruction at a time. For example, a single instruction can be executed upon receiving an indication to perform a single-step operation. For example, the indication to perform the single-step operation can be received via the state access logic 207.

The state access logic 207 can include an interface for other cores and/or a processor-level control unit (such as the control unit 160 of FIG. 1) to communicate with and access state of the core 111. For example, the state access logic 207 can be connected to a core interconnect (such as the core interconnect 120 of FIG. 1) and the other cores can communicate via control signals, messages, reading and writing registers, and the like.

The state access logic 207 can include control state registers or other logic for modifying and/or examining modes and/or status of an instruction block and/or core status. As an example, the core status can indicate whether particular resources are statically allocated to a context, such as instruction cache, data cache, instruction windows, load store queue, register files, and/or functional units. As a further example, the core status can indicate whether particular resources are temporally allocated to a context, such as data cache, register files, load store queue, and/or a next branch predictor. The state access logic 207 can further store data indicating whether the instruction block is ready to commit, whether the instruction block is performing a commit, and whether the instruction block is idle. The state access logic 207 can further store data indicating whether a block has been folded across multiple slices of execution resources, as will be further detailed below. As another example, the status of an instruction block can include a token or flag indicating the instruction block is the oldest instruction block executing and a flag indicating the instruction block is executing speculatively.

In some examples, some or all registers in the state access logic 207 can be mapped to unique memory locations that are reserved for use by the block-based processor. In some examples, the state access logic 207 registers can be accessed using general purpose memory read and write instructions of the block-based processor. Additionally or alternatively, the state access logic 207 registers can be accessed using specific read and write instructions. Thus, one core can examine the configuration state by reading assigned memory locations and/or using specific instructions.

The state access logic 207 can include registers or other logic for configuring and/or reconfiguring the core to operate in different operating modes, as described further herein. For example, the state access logic 207 can include a control register bit that controls whether specific resources are spatially or temporally allocated to a particular context.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instructions for an instruction block and stores the decoded instructions within a memory store 215 and 216 located in each respective instruction window 210 and 211.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (This application will refer to 32-bits of data as a word, unless otherwise specified.) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associated with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, a predicate buffer 244, and an instruction scoreboard 245. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands are read from the operand buffers 242 and 243, not the register file.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF (instruction fetch) and DC (instruction decode) can run decoupled from the back-end pipelines stages (IS (issue), EX (execution), LS (load/store)). In one embodiment, the control unit can fetch and decode two instructions per clock cycle into each of the instruction windows 210 and 211. In alternative embodiments, the control unit can fetch and decode one, four, or another number of instructions per clock cycle into a corresponding number of instruction windows. The control unit 205 provides instruction window dataflow scheduling logic to monitor the ready state of each decoded instruction's inputs (e.g., each respective instruction's predicate(s) and operand(s) using the scoreboard 245. When all of the inputs for a particular decoded instruction are ready, the instruction is ready to issue. The control logic 205 then initiates execution of one or more next instruction(s) (e.g., the lowest numbered ready instruction) each cycle and its decoded instruction and input operands are sent to one or more of functional units 260 for execution. The decoded instruction can also encode a number of ready events. The scheduler in the control logic 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and instructions can be scheduled in a first-in first-out (FIFO) order from the ready queue. Information stored in the scoreboard 245 can include, but is not limited to, the associated instruction's execution predicate (such as whether the instruction is waiting for a predicate bit to be calculated and whether the instruction executes if the predicate bit is true or false), availability of operands to the instruction, or other prerequisites required before executing the associated individual instruction.

In one embodiment, the scoreboard 245 can include decoded ready state, which is initialized by the instruction decoder 228, and active ready state, which is initialized by the control unit 205 during execution of the instructions. For example, the decoded ready state can encode whether a respective instruction has been decoded, awaits a predicate and/or some operand(s), perhaps via a broadcast channel, or is immediately ready to issue. The active ready state can encode whether a respective instruction awaits a predicate and/or some operand(s), is ready to issue, or has already issued. The decoded ready state can cleared on a block reset or a block refresh. Upon branching to a new instruction block, the decoded ready state and the active ready state is cleared (a block or core reset). However, when an instruction block is re-executed on the core, such as when it branches back to itself (a block refresh), only active ready state is cleared. Block refreshes can occur immediately (when an instruction block branches to itself) or after executing a number of other intervening instruction blocks. The decoded ready state for the instruction block can thus be preserved so that it is not necessary to re-fetch and decode the block's instructions. Hence, block refresh can be used to save time and energy in loops and other repeating program structures.

The number of instructions that are stored in each instruction window generally corresponds to the number of instructions within an instruction block. In some examples, the number of instructions within an instruction block can be 32, 64, 128, 1024, or another number of instructions. In some examples of the disclosed technology, an instruction block is allocated across multiple instruction windows within a processor core. In some examples, the instruction windows 210, 211 can be logically partitioned so that multiple instruction blocks can be executed on a single processor core. For example, one, two, four, or another number of instruction blocks can be executed on one core. The respective instruction blocks can be executed concurrently or sequentially with each other.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 can include a load/store queue 275, which can be used to issue memory instructions, a data cache 277, which stores data being output from the core to memory, and load/store pipeline register 278.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

As will be readily apparent to one of ordinary skill in the relevant art having the benefit of the present disclosure, trade-offs can be made in processor performance by the design and allocation of resources within the instruction window (e.g., instruction window 210) and control logic 205 of the processor cores 110. The area, clock period, capabilities, and limitations substantially determine the realized performance of the individual cores 110 and the throughput of the block-based processor cores 110.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some examples, the instruction scheduler 206 is implemented using storage (e.g., first-in first-out (FIFO) queues, content addressable memories (CAMs)) storing data indicating information used to schedule execution of instruction blocks according to the disclosed technology. For example, data regarding instruction dependencies, transfers of control, speculation, branch prediction, and/or data loads and stores are arranged in storage to facilitate determinations in mapping instruction blocks to processor cores. For example, instruction block dependencies can be associated with a tag that is stored in a FIFO or CAM and later accessed by selection logic used to map instruction blocks to one or more processor cores. In some examples, the instruction scheduler 206 is implemented using a general-purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the instruction scheduler 206. As will be readily apparent to one of ordinary skill in the relevant art having the benefit of the present disclosure, other circuit structures, implemented in an integrated circuit, programmable logic, or other suitable logic can be used to implement hardware for the instruction scheduler 206.

In some cases, the scheduler 206 accepts events for target instructions that have not yet been decoded and must also inhibit reissue of issued ready instructions. Instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions.

V. Example Stream of Instruction Blocks

Figure 3:
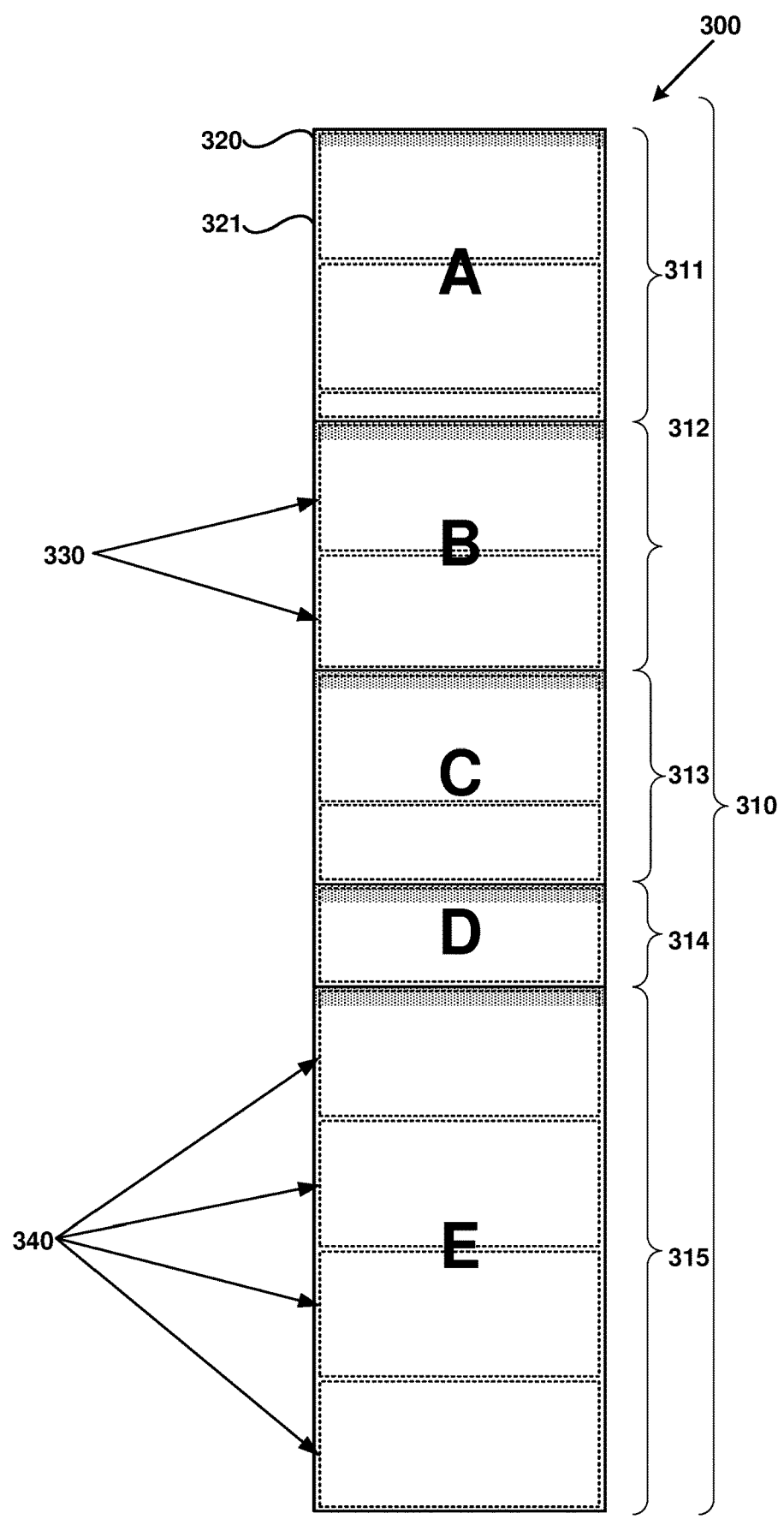
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-315 (A-E) is illustrated. The stream of instructions can be used to implement user application, system services, or any other suitable use. In the example shown in FIG. 3, each instruction block begins with an instruction header, which is followed by a varying number of instructions. For example, the "A" instruction block 311 includes a four-word header 320 and seventy instructions 321. In some examples, an instruction block is divided or "folded" to fit into resources that have been allocated for executing the instruction block. For example, a block-based processor according to the disclosed technology may include instruction windows configured to track state and execute instructions in 32-word chunks. Thus, the A instruction block 311 can be divided into three portions. These portions may be allocated to three execution slices, or results from the first instruction block portion can be temporarily stored in a results buffer before passing to the subsequent, second portion of the instruction block. Similarly, the "B" instruction block 312 is a 64-word instruction block that can be divided into two, 32-word portions 330, and the "E" instruction block 315 is a 128-word instruction block that can be divided into four, 32-word portions 340. As will be readily understood to one of ordinary skill in the art having the benefit of the present disclosure, instruction blocks may be divided into different size portions, depending on resources in a particular implementation. Further, compilers adapted to generate machine instructions for disclosed processors can arrange instructions within an instruction block to improve processor performance, by, for example, allocating instructions to fall within certain portions of an instruction block. In other configurations, processor resources can be combined such that the instruction block (e.g., instruction block 311 or 315) is fetched and executed as a single instruction block. In some examples, a processor according to the disclosed technologies can be re-configured to operate in two or more different such modes.

The particular, exemplary instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include execution flags, which indicate special instruction execution requirements. For example, branch prediction or memory dependence prediction can be inhibited for certain instruction blocks, depending on the particular application. As another example, an execution flag can be used to control whether the instruction block is executed in the default execution mode or the debug execution mode.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or bad jump detection. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The instruction block header 320 also includes a store mask which identifies the load-store queue identifiers that are assigned to store operations. The instruction block header can also include a write mask, which identifies which global register(s) the associated instruction block will write. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

VI. Example Block Instruction Target Encoding

Figure 4:
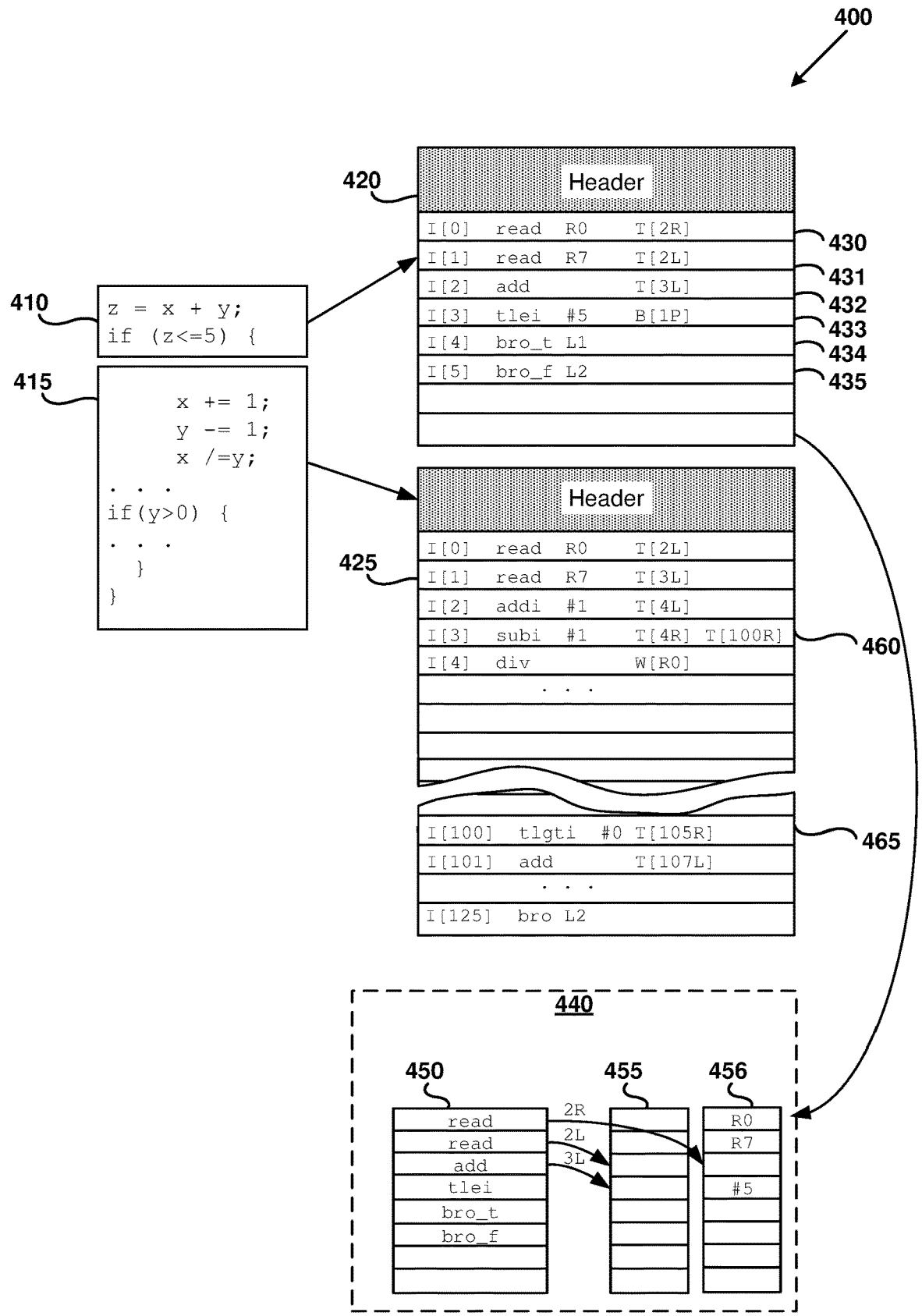
FIG. 4 illustrates portions of source code and respective instruction blocks.

FIG. 4 is a diagram 400 depicting an example of two portions 410 and 415 of C language source code and their respective instruction blocks 420 and 425 (in assembly language), illustrating how block-based instructions can explicitly encode their targets. The high-level C language source code can be translated to the low-level assembly language and machine code by a compiler whose target is a block-based processor. A high-level language can abstract out many of the details of the underlying computer architecture so that a programmer can focus on functionality of the program. In contrast, the machine code encodes the program according to the target computer's ISA so that it can be executed on the target computer, using the computer's hardware resources. Assembly language is a human-readable form of machine code.

In the following examples, the assembly language instructions use the following nomenclature: "I[number>] specifies the number of the instruction within the instruction block where the numbering begins at zero for the instruction following the instruction header and the instruction number is incremented for each successive instruction; the operation of the instruction (such as READ, ADDI, DIV, and the like) follows the instruction number; optional values (such as the immediate value 1) or references to registers (such as R0 for register 0) follow the operation; and optional targets that are to receive the results of the instruction follow the values and/or operation. Each of the targets can be to another instruction, a broadcast channel to other instructions, or a register that can be visible to another instruction block when the instruction block is committed. An example of an instruction target is T[1R] which targets the right operand of instruction 1. An example of a register target is W[R0], where the target is written to register 0.

In the diagram 400, the first two READ instructions 430 and 431 of the instruction block 420 target the right (T[2R]) and left (T[2L]) operands, respectively, of the ADD instruction 432. In the illustrated ISA, the read instruction is the only instruction that reads from the global register file; however any instruction can target, the global register file. When the ADD instruction 432 receives the result of both register reads it will become ready and execute.

When the TLEI (test-less-than-equal-immediate) instruction 433 receives its single input operand from the ADD, it will become ready and execute. The test then produces a predicate operand that is broadcast on channel one (B[1P]) to all instructions listening on the broadcast channel, which in this example are the two predicated branch instructions (BRO_T 434 and BRO_F 435). The branch that receives a matching predicate will fire.

A dependence graph 440 for the instruction block 420 is also illustrated, as an array 450 of instruction nodes and their corresponding operand targets 455 and 456. This illustrates the correspondence between the instruction block 420, the corresponding instruction window entries, and the underlying dataflow graph represented by the instructions. Here decoded instructions READ 430 and READ 431 are ready to issue, as they have no input dependencies. As they issue and execute, the values read from registers R6 and R7 are written into the right and left operand buffers of ADD 432, marking the left and right operands of ADD 432 "ready." As a result, the ADD 432 instruction becomes ready, issues to an ALU, executes, and the sum is written to the left operand of TLEI 433.

In some examples, a larger instruction block may be processed in smaller portions to allow for allocation of processor resources to execute the block. For example, a processor adapted to execute up to 128-word instruction blocks can be configured to process to the blocks in 32-word portions. However, instruction results may need to be passed between instruction block portions in certain examples. For example, the subi #1 instruction 460 targets both the right operand of instruction number 4 ("T[4R]") and the right operand of instruction number 100 ("T[100R]"). Thus, when a processor is configured to process the instruction block in smaller portions, a results buffer is used to temporarily store the target operands of the instruction until the target instruction 465 can consume its input operand(s).

As a comparison, a conventional out-of-order RISC or CISC processor would dynamically build the dependence graph at runtime, using additional hardware complexity, power, area, and reducing clock frequency and performance. However, the dependence graph is known statically at compile time and an EDGE compiler can directly encode the producer-consumer relations between the instructions through the ISA, freeing the microarchitecture from rediscovering them dynamically. This can potentially enable a simpler microarchitecture, reducing area, power and boosting frequency and performance.

VII. Example Block-Based Instruction Formats

Figure 5:
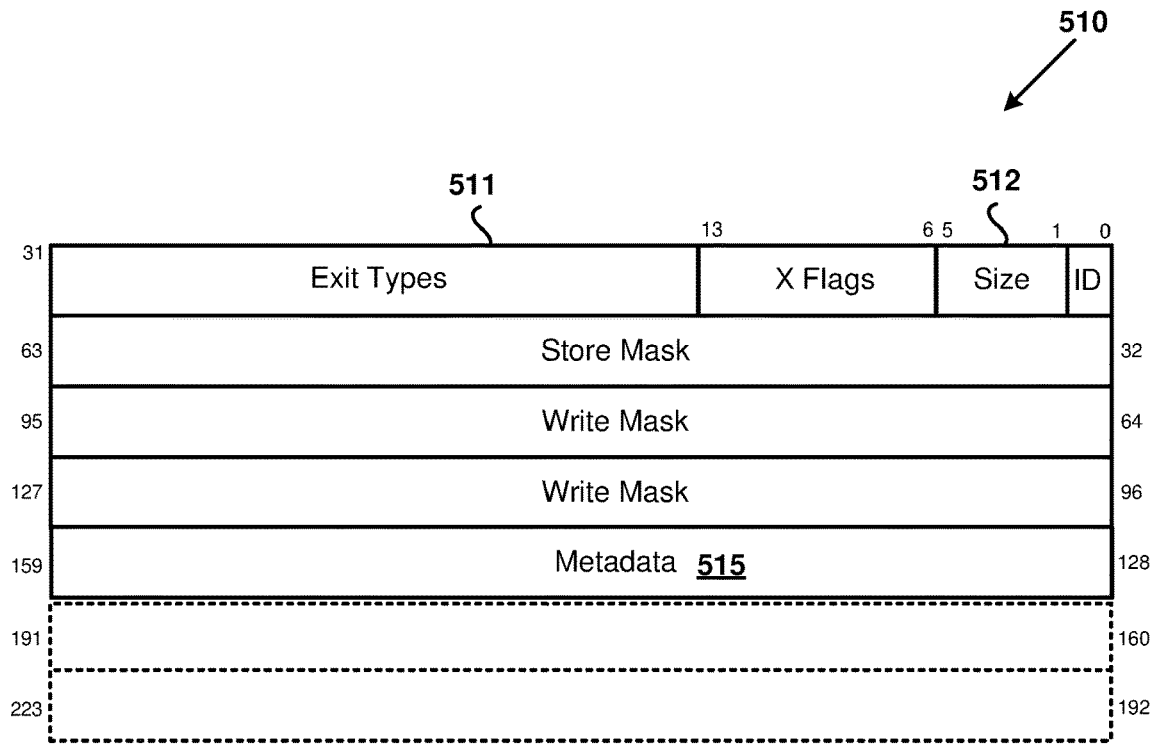
FIG. 5 illustrates block-based processor headers and instructions, as can be used in some examples of the disclosed technology.
Figure 5:
Figure 5:
Figure 5:
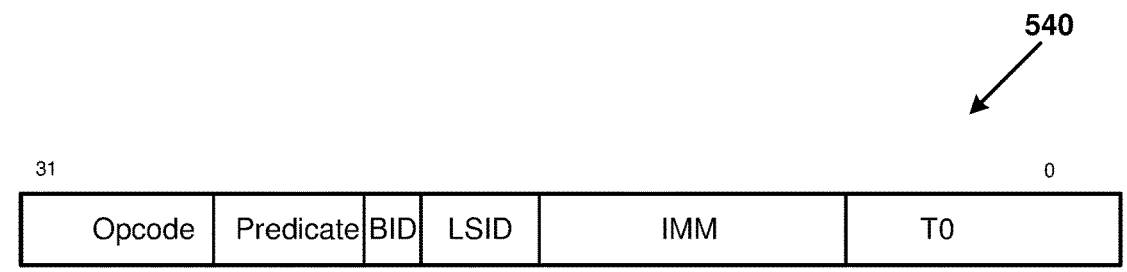

FIG. 5 is a diagram illustrating generalized examples of instruction formats for an instruction header 510, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a number of exit type fields 511, a number of execution flag fields, an instruction block size field 512, and an instruction header ID bit (the least significant bit of the instruction header). In some examples, the instruction header 510 includes additional metadata 515, which can be used to control additional aspects of instruction block execution and performance.

The execution flag fields depicted in FIG. 5 occupy bits 6 through 13 of the instruction block header 510 and indicate one or more modes of operation for executing the instruction block. For example, the modes of operation can include core fission operation (e.g., by specifying whether the instruction block is to be executed using all or a portion, or with a quantity of execution resources), vector mode operation, branch predictor inhibition, memory dependence predictor inhibition, block synchronization, break after block, break before block, block fall through, and/or in-order or deterministic instruction execution. The block synchronization flag occupies bit 9 of the instruction block and inhibits speculative execution of the instruction block when set to logic 1.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. Addresses can be calculated for next instruction blocks to be speculatively executed and stored in an instruction block address register. In some examples, up to six exit types can be encoded in the exit type fields, and the correspondence between fields and corresponding explicit or implicit control flow instructions can be determined by, for example, examining control flow instructions in the instruction block.

The illustrated generic block instruction 520 is stored as one 32-bit word and includes an opcode field, a predicate field, a broadcast ID field (BID), a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specify the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. The execution flow is modified by changing the value of an instruction block address register (e.g., using a branch instruction to implicitly change the value to point to the memory location of the next instruction block to execute), while in other examples, the execution flow can be changed by modifying a value stored at a designated location in virtual memory (e.g., by a memory controller configured to detect reads and write to designated memory location and store/load the values to an instruction block address register). In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), an immediate field (IMM) offset field, and a target field. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory).

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

VIII. Example States of a Processor Core

Figure 6:
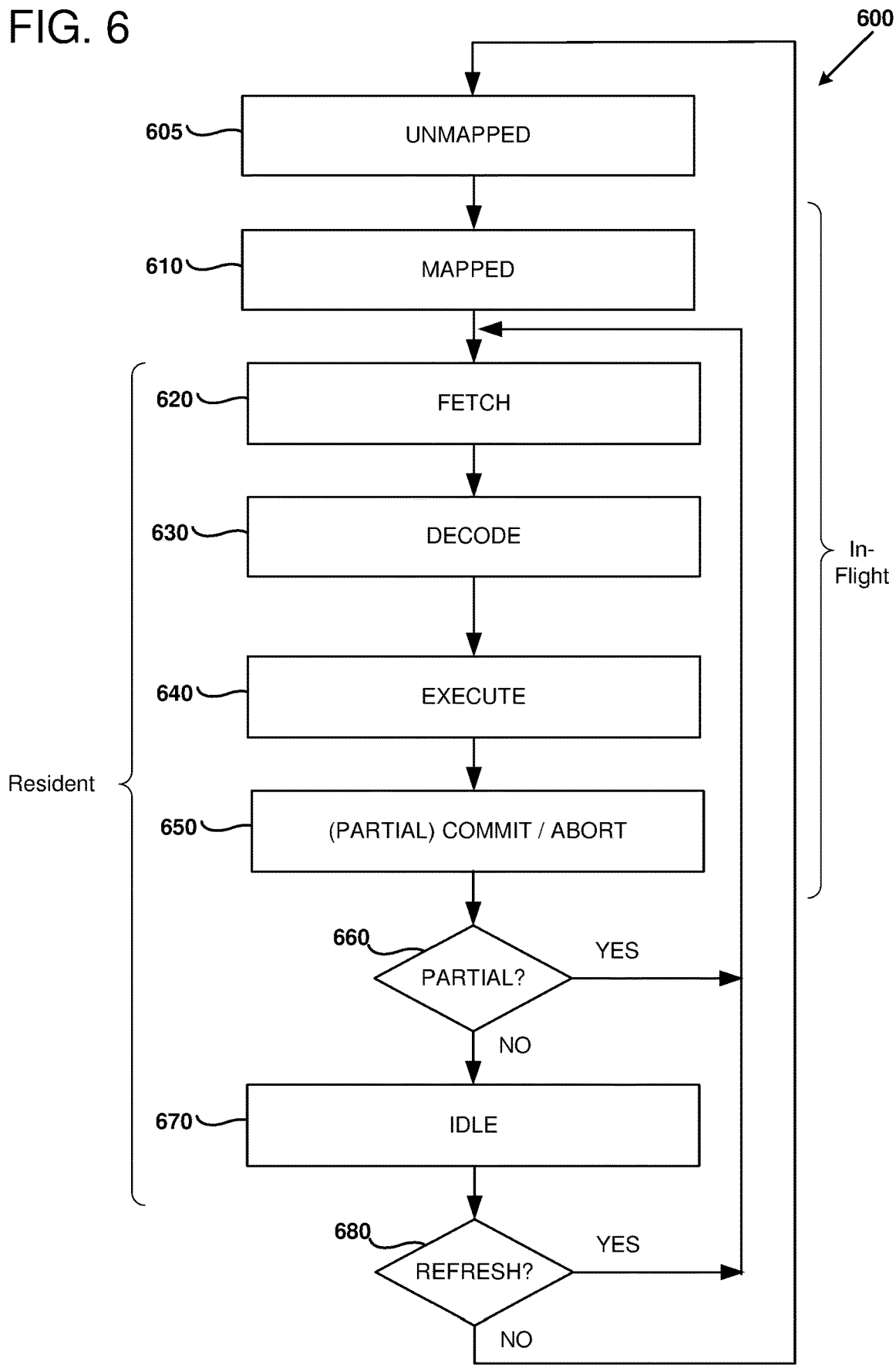
FIG. 6 is a flowchart illustrating an example of a progression of states of a processor core of a block-based processor.

FIG. 6 is a flowchart illustrating an example of a progression of states 600 of a processor core of a block-based computer. The block-based computer is composed of multiple processor cores that are collectively used to run or execute a software program. The program can be written in a variety of high-level languages and then compiled for the block-based processor using a compiler that targets the block-based processor. The compiler can emit code that, when run or executed on the block-based processor, will perform the functionality specified by the high-level program. The compiled code can be stored in a computer-readable memory that can be accessed by the block-based processor. The compiled code can include a stream of instructions grouped into a series of instruction blocks. During execution, one or more of the instruction blocks can be executed by the block-based processor to perform the functionality of the program. Typically, the program will include more instruction blocks than can be executed on the cores at any one time. Thus, blocks of the program are mapped to respective cores, the cores perform the work specified by the blocks, and then the blocks on respective cores are replaced with different blocks until the program is complete. Some of the instruction blocks may be executed more than once, such as during a loop or a subroutine of the program. An "instance" of an instruction block can be created for each time the instruction block will be executed. Thus, each repetition of an instruction block can use a different instance of the instruction block. As the program is run, the respective instruction blocks can be mapped to and executed on the processor cores based on architectural constraints, available hardware resources, and the dynamic flow of the program. During execution of the program, the respective processor cores can transition through a progression of states 600, so that one core can be in one state and another core can be in a different state.

At state 605, a state of a respective processor core can be unmapped. An unmapped processor core is a core that is not currently assigned to execute an instance of an instruction block. For example, the processor core can be unmapped before the program begins execution on the block-based computer. As another example, the processor core can be unmapped after the program begins executing but not all of the cores are being used. In particular, the instruction blocks of the program are executed, at least in part, according to the dynamic flow of the program. Some parts of the program may flow generally serially or sequentially, such as when a later instruction block depends on results from an earlier instruction block. Other parts of the program may have a more parallel flow, such as when multiple instruction blocks can execute at the same time without using the results of the other blocks executing in parallel. Fewer cores can be used to execute the program during more sequential streams of the program and more cores can be used to execute the program during more parallel streams of the program.

At state 610, the state of the respective processor core can be mapped. A mapped processor core is a core that is currently assigned to execute an instance of an instruction block. When the instruction block is mapped to a specific processor core, the instruction block is in-flight. An in-flight instruction block is a block that is targeted to a particular core of the block-based processor, and the block will be or is executing, either speculatively or non-speculatively, on the particular processor core. In particular, the in-flight instruction blocks correspond to the instruction blocks mapped to processor cores in states 610-650. A block executes non-speculatively when it is known during mapping of the block that the program will use the work provided by the executing instruction block. A block executes speculatively when it is not known during mapping whether the program will or will not use the work provided by the executing instruction block. Executing a block speculatively can potentially increase performance, such as when the speculative block is started earlier than if the block were to be started after or when it is known that the work of the block will be used. However, executing speculatively can potentially increase the energy used when executing the program, such as when the speculative work is not used by the program.

A block-based processor includes a finite number of homogeneous or heterogeneous processor cores. A typical program can include more instruction blocks than can fit onto the processor cores. Thus, the respective instruction blocks of a program will generally share the processor cores with the other instruction blocks of the program. In other words, a given core may execute the instructions of several different instruction blocks during the execution of a program. Having a finite number of processor cores also means that execution of the program may stall or be delayed when all of the processor cores are busy executing instruction blocks and no new cores are available for dispatch. When a processor core becomes available, an instance of an instruction block can be mapped to the processor core.

An instruction block scheduler can assign which instruction block will execute on which processor core and when the instruction block will be executed. The mapping can be based on a variety of factors, such as a target energy to be used for the execution, the number and configuration of the processor cores, the current and/or former usage of the processor cores, the dynamic flow of the program, whether speculative execution is enabled, a confidence level that a speculative block will be executed, and other factors. An instance of an instruction block can be mapped to a processor core that is currently available (such as when no instruction block is currently executing on it). In one embodiment, the instance of the instruction block can be mapped to a processor core that is currently busy (such as when the core is executing a different instance of an instruction block) and the later-mapped instance can begin when the earlier-mapped instance is complete.

At state 620, the state of the respective processor core can be fetch. For example, the IF pipeline stage of the processor core can be active during the fetch state. Fetching an instruction block can include transferring the block from memory (such as the L1 cache, the L2 cache, or main memory) to the processor core, and reading instructions from local buffers of the processor core so that the instructions can be decoded. For example, the instructions of the instruction block can be loaded into an instruction cache, buffer, or registers of the processor core. Multiple instructions of the instruction block can be fetched in parallel (e.g., at the same time) during the same clock cycle. The fetch state can be multiple cycles long and can overlap with the decode (630) and execute (640) states when the processor core is pipelined.

When instructions of the instruction block are loaded onto the processor core, the instruction block is resident on the processor core. The instruction block is partially resident when some, but not all, instructions of the instruction block are loaded. The instruction block is fully resident when all instructions of the instruction block are loaded. The instruction block will be resident on the processor core until the processor core is reset or a different instruction block is fetched onto the processor core. In particular, an instruction block is resident in the processor core when the core is in states 620-670.

At state 630, the state of the respective processor core can be decode. For example, the DC pipeline stage of the processor core can be active during the fetch state. During the decode state, instructions of the instruction block are being decoded so that they can be stored in the memory store of the instruction window of the processor core. In particular, the instructions can be transformed from relatively compact machine code, to a less compact representation that can be used to control hardware resources of the processor core. The decode state can be multiple cycles long and can overlap with the fetch (620) and execute (640) states when the processor core is pipelined. After an instruction of the instruction block is decoded, it can be executed when all dependencies of the instruction are met.

At state 640, the state of the respective processor core can be execute. The execute state can include various modes of operation, such as a default execution mode and a debug mode. During the default mode of the execute state, instructions of the instruction block are being executed. In particular, the EX and/or LS pipeline stages of the processor core can be active during the execute state. The instruction block can be executing speculatively or non-speculatively. A speculative block can execute to completion or it can be terminated prior to completion, such as when it is determined that work performed by the speculative block will not be used. When an instruction block is terminated, the processor can transition to the abort state. A speculative block can complete when it is determined the work of the block will be used, all register writes are buffered, all writes to memory are buffered, and a branch target is calculated, for example. A non-speculative block can execute to completion when all register writes are buffered, all writes to memory are buffered, and a branch target is calculated, for example. The execute state can be multiple cycles long and can overlap with the fetch (620) and decode (630) states when the processor core is pipelined. When the instruction block is complete, the processor can transition to the commit state.

During the debug mode of the execute state, instructions of the instruction block can be single-stepped or executed one at a time. For example, the processor core can be halted in the debug mode of the execute state, such as when a control signal is asserted or when the instruction header specifies that the debug mode is to be used for the instruction block. Upon receiving an indication to perform a single-step operation, one instruction of the instruction block can be executed. The intermediate state of the processor core can be scanned or read out of the processor core. The process can be repeated for the next instruction of the instruction block upon receiving another indication to perform a single-step operation. The "next" instruction can be determined based on a compiler-generated order, a scheduler-generated order, or an order generated outside of the processor core (such as by debug software running on a different core). The instructions of the block can continue to be single-stepped until the commit conditions are met, and then the processor can transition to the commit state.

At state 650, the state of the respective processor core can be set to commit or abort. During commit, the work of the instructions of the instruction block can be atomically committed so that other blocks can use the work of the instructions. In particular, the commit state can include a commit phase where locally buffered architectural state is written to architectural state that is visible to or accessible by other processor cores. When the visible architectural state is updated, a commit signal can be issued and the processor core can be released so that another instruction block can be executed on the processor core. During the abort state, the pipeline of the core can be halted to reduce dynamic power dissipation. In some applications, the core can be power gated to reduce static power dissipation. At the conclusion of the commit/abort states, the processor core can receive a new instruction block to be executed on the processor core, the core can be refreshed, the core can be idled, or the core can be reset.

In certain examples of the disclosed technology, an instruction block is divided into portions and the individual portions are executed using different spatially and/or temporally allocated resources. For example, an execution slice of a processor may be adapted to handle 32-word portions of an instruction block. When all the instructions of a portion have executed, then the results produced by this respective portion may be partially committed. In some examples, the partially committed results are actually written to an architectural register file, temporarily stored in a physical register file, and/or actually written to memory. In other examples, the partially committed results are temporarily stored until it is determined whether the entire instruction block will be committed or aborted.

At state 660, it can be determined if the instruction block has additional portions to fetch, decode and execute. For example, if the instruction block size is greater than the maximum number of instructions that can be processed by the current context's allocated resources, results from the current portion are stored in a results buffer, and the processor proceeds to state 620 in order to fetch, decode, and execute instructions for a subsequent portion of the instruction block. In some examples, the portions may be concurrently fetched, decoded, and executed by allocating multiple slices of execution logic to the context. If the instruction block size is equal or less than the maximum number of instructions that can be processed by the current context's allocated resources, or if there are no remaining portion of the current instruction block to execute, the processor proceeds to state 670.

At state 670, the state of the respective processor core can be idle. The performance and power consumption of the block-based processor can potentially be adjusted or traded off based on the number of processor cores that are active at a given time. For example, performing speculative work on concurrently running cores may increase the speed of a computation but increase the power if the speculative misprediction rate is high. As another example, immediately allocating new instruction blocks to processors after committing or aborting an earlier executed instruction block may increase the number of processors executing concurrently, but may reduce the opportunity to reuse instruction blocks that were resident on the processor cores. Reuse may be increased when a cache or pool of idle processor cores is maintained. For example, when a processor core commits a commonly used instruction block, the processor core can be placed in the idle pool so that the core can be refreshed the next time that the same instruction block is to be executed. As described above, refreshing the processor core can save the time and energy used to fetch and decode the resident instruction block. The instruction blocks/processor cores to place in an idle cache can be determined based on a static analysis performed by the compiler or a dynamic analysis performed by the instruction block scheduler. For example, a compiler hint indicating potential reuse of the instruction block can be placed in the header of the block and the instruction block scheduler can use the hint to determine if the block will be idled or reallocated to a different instruction block after committing the instruction block. When idling, the processor core can be placed in a low-power state to reduce dynamic power consumption, for example.

At state 680, it can be determined if the instruction block resident on the idle processor core can be refreshed. If the core is to be refreshed, the block refresh signal can be asserted and the core can transition to the execute state (640). If the core is not going to be refreshed, the block reset signal can be asserted and the core can transition to the unmapped state (605). When the core is reset, the core can be put into a pool with other unmapped cores so that the instruction block scheduler can allocate a new instruction block to the core.

IX. Example Processor Microarchitecture

Figure 7:
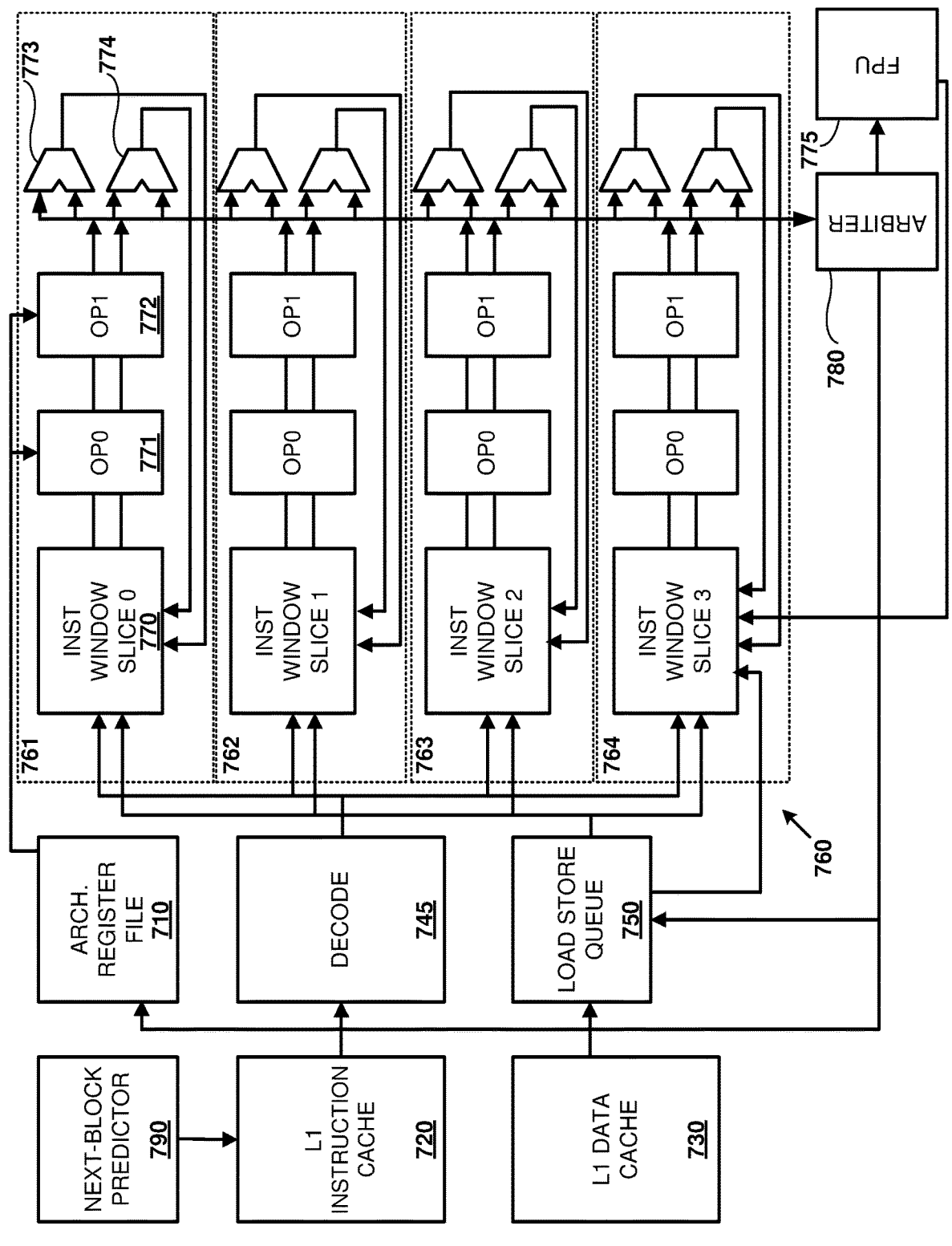
FIG. 7 is a block diagram illustrating an example processor configurable to operate in plural operation modes, as can be used in certain examples of the disclosed technology.

FIG. 7 is a block diagram 700 outlining an example processor microarchitecture in which certain aspects of the disclosed technology can be implemented. For example, block based processor ISAs, including EDGE ISAs can be implemented using architectures similar to that illustrated in the block diagram 700. The microarchitecture depicted can be implemented in any suitable technology, including as an integrated circuit, an SOC, or with programmable logic, such as in an FPGA.

The illustrated example microarchitecture includes an architectural register file 710 that contains registers that store architectural state, which can be passed to and from different instruction blocks. The architectural state registers are defined by the processor's instruction set architecture. Because the register file is architecturally visible to the programmer, each concurrently executing context (e.g., a thread or process) is allocated its own register file, or its own portion of the architectural register file 710. In some examples, this can be implemented by providing a separate register file for each context, or by using a single register file large enough to accommodate every active context, but having appropriate partitions. Any suitable storage technology can be used to implement the architectural register file 710, including the use of storage elements formed from flip-flops and latches, static RAM (SRAM), or other suitable memory technology. The architectural register file 710 can be formed from a portion or all of a physical register file, which is an array of registers formed from storage elements, that is not necessarily restricted to the processor ISA. For example, physical register files can be partitioned to form multiple architectural register files, each of which is associated with a particular context. In some examples, the physical register may be configured to store renamed register values, or to store register values for a speculatively executed thread or process. Physical register files can be formed from similar storage elements, including flip-flops and latches, static RAM (SRAM), or other suitable memory technology. Such register files can also have multiple input ports and/or multiple read ports in certain implementations.

The example microarchitecture further includes a level one (L1) instruction cache 720 and an L1 data cache 730. In some examples or configurations, the instruction cache 720 and the data cache 730 can be shared across all active contexts. In other examples, one or both of the instruction cache 720 and data cache 730 are partitioned into a number of separate banks. For example, the data cache can be partitioned such that there is one bank per context, and each partition of the cache is private to each respective context. In examples where context received private instruction and/or data cache partitions, additional control logic is used to maintain cache coherency.

The example microarchitecture depicted in FIG. 7 further includes decoder logic 745, a load store queue 750, a set 760 of a number of functional unit slices 761, 762, 763, and 764. Each of the functional slices 761-764 contain execution logic used for performing operations associated with instructions, for example, instructions in an EDGE instruction block. The example microarchitecture processor can be configured such that the slices are allocated to one, two, three, or four different contexts. For example, all of the functional slices 761-764 can be allocated for execution of a single context by the processor. The processor can later be reconfigured such that a first functional slice 761 is used to execute a first context, a second functional slice 762 is used to execute a second context, and so forth. The functional slices 761-764 are spatially allocated, in that the resources of the functional slice are allocated to a particular context in a pre-determined fashion. Thus, unlike other technologies where contexts share the use of functional resources when, for example, resources of the functional slice are stalled, in the illustrated embodiment, the spatially-allocated resources are dedicated to the context for a pre-determined period.

Each of the functional slices includes similar execution resources, including, by example, for instruction slice 761: an instruction window slice 770, a first operand buffer 771, and a second operand buffer 772, and one or more execution units, including, for example, execution units 773 or 774. The illustrated execution units can include, for example, integer arithmetic and logic units (ALU), adders, subtractors, multipliers, dividers, shifters, rotators, or other suitable execution units. In the illustrated example, a floating point unit (FPU) 775 is included and can be shared by any of the contexts executing with any of the illustrated functional slices 761-764. In other examples, FPUs and other specialized logic, such as DSPs or graphics functions can be shared, or can be included within a slice and thus not shared outside of the context currently assigned to the slice or slices.

The instruction window slice (e.g., instruction window slice 770) stores information such as decoded instructions, state information for the current execution state of the instruction block, as well as control logic for controlling execution of the context upon the instruction slice or slices. In some examples, a functional slice can execute more than one instruction per clock cycle. The instruction window slice 770 can further include logic for providing control speculation. The operand buffers temporarily store operands generated for and consumed by instructions within an instruction block mapped to the functional slice. For example, in an EDGE ISA, data operands generated by an instruction can be temporarily stored in one of the operand buffers before being used by one of the functional units, and the result sent to the instructions target.

The illustrated microarchitecture further includes an arbiter circuit 780 which controls the flow of data from the operand buffers to the functional units. For example, the arbiter circuit can cause pausing of execution of instructions within or between slices based on the availability of functional execution units to consume the data. The arbiter circuit 780 can further control access to the load store queue 750 and the register file 710, as output is generated from the respective instruction block. For example, the microarchitecture may support only one or two writes to the load store queue 750 per clock cycle, and thus the arbiter logic will select which of the slices are permitted to access the load store queue 750 on a given clock cycle.

The illustrated microarchitecture further includes a next block predictor circuit 790. The next block predictor can be used to provide branch prediction for branch instructions within an instruction block. The next block predictor 790 can accept as input one or more of the following: a target block address, whether a branch was taken or not taken, a source block address, or an identifier for an execution context (e.g., a thread or process ID). In some examples, each of the functional slices is allocated a separate next block predictor. In other examples, the next block predictor is temporally shared between functional slices, as will be discussed in further detail in the examples below.

X. Example Allocations of Processor Resources

Figure 8A:
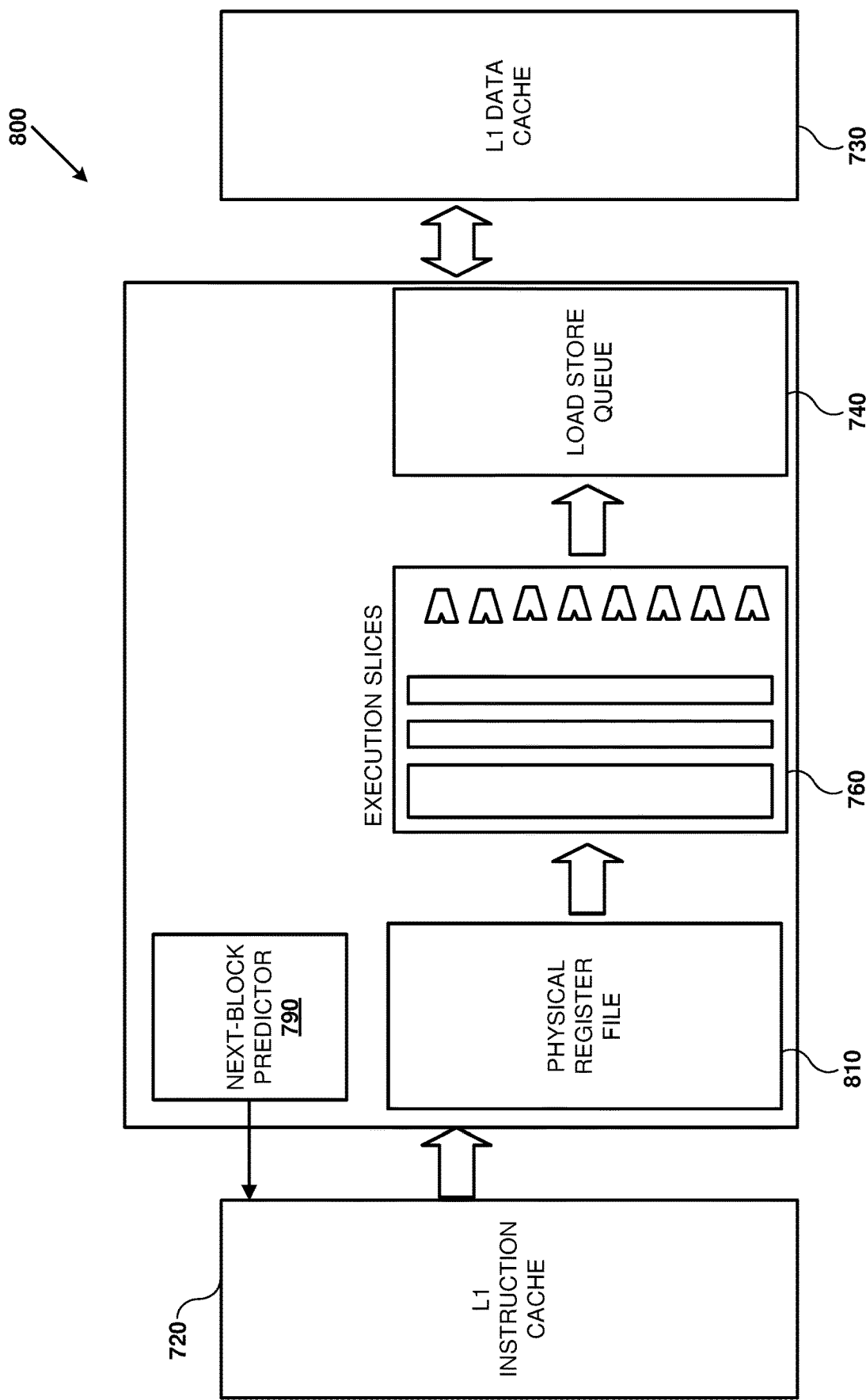
FIGS. 8A-8C are block diagrams illustrating an example processor being configured to operate in plural operation modes, as can be used in certain examples of the disclosed technology.
Figure 8B:
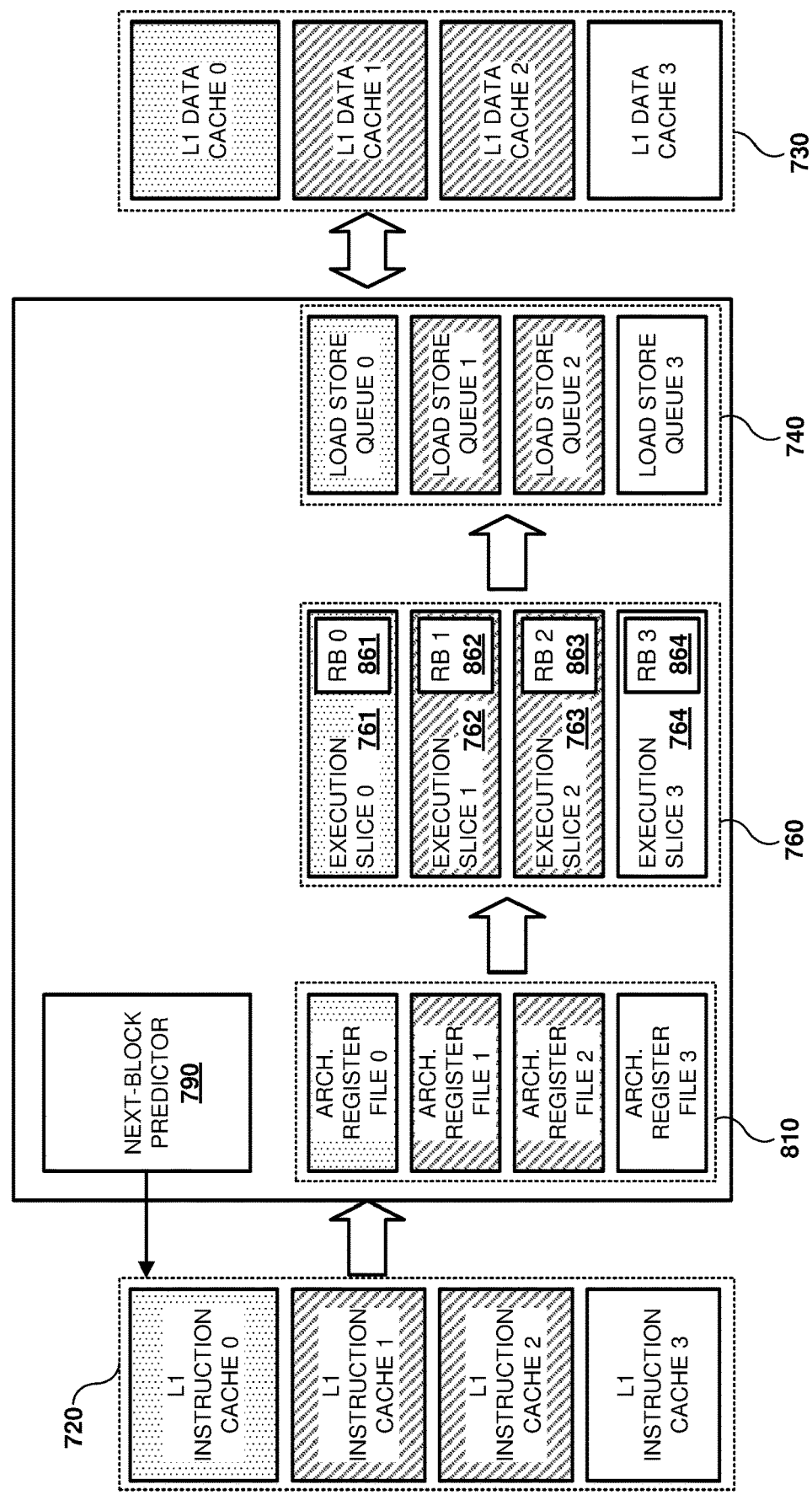
Figure 8C:
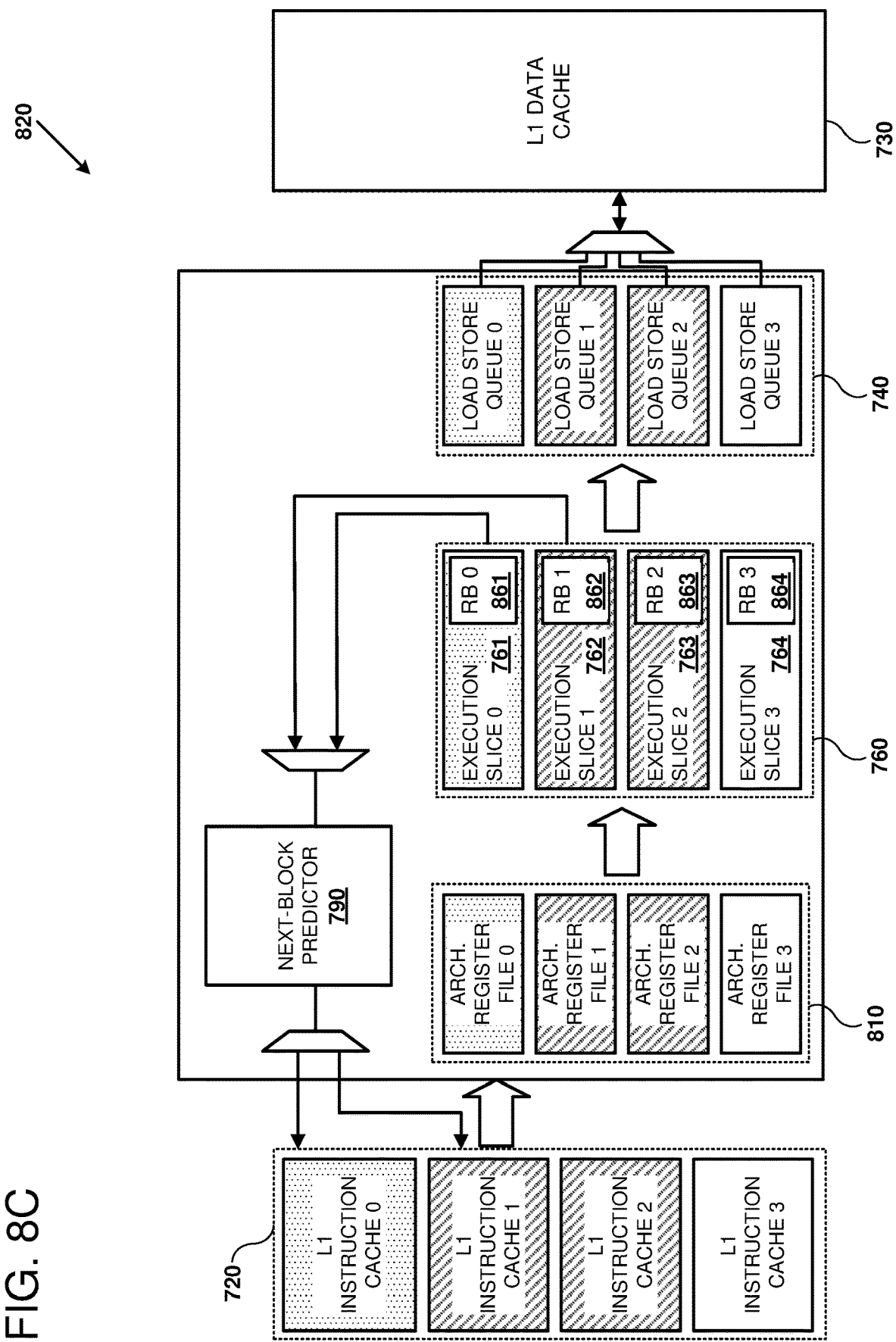

FIGS. 8A-8C are diagrams illustrating example allocations of resources to contexts in a block-based processor, as can be performed in certain examples of the disclosed technology. For example, an EDGE ISA processor can be implemented using the illustrated microarchitecture.

FIG. 8A is a block diagram 800 illustrating a configuration of the processor in a first mode. While the processor is in this first mode, all functional slices are available to a single context. The illustrated processor includes an instruction cache 720 that stores instructions for instruction blocks fetched from a memory coupled to the processor. The processor further includes a physical register file 810, an L1 data cache 730, a load store queue 740, and a set of execution slices 760. The processor further includes a next block predictor 790. While in this first mode, all of the resources within the instruction cache 720, the physical register file 810, the execution resources 760, the load store queue 740, the data cache 730, and the next block predictor 790 are available for executing a single context. In the illustrated example, the resources of the processor can be divided such that there are four execution slices.

In one example of the disclosed technology, each slice includes a private instruction window that can store up to 128 instructions, along with sufficient operand buffers and a fully-sized private load store queue. Assuming that the largest block can comprise 128 instructions, the example implements a 128-instruction window (which may hold a single large enough block, or several smaller blocks). In such a configuration, dividing the processor into slices reduces the execution units assigned to a slice, but does not reduce the overhead associated with operand buffers, load store queue and other resources used to support a context. Thus, although the private instruction window can accommodate an entire 128-instruction block, the processor does not include resources to take complete advantage of such a large instruction window. Thus, in many cases the processor is over-provisioned and its resources may be underutilized.

In other examples of the disclosed technology, the processor may logically divide the execution resources 760 into "slices" and choose to execute instructions within and across slices in parallel. For example, it may divide the 128-instruction window into four slices, and execute up to two instructions from each slice (for a total of up to 8) every cycle. FIG. 8B is a block diagram 810 illustrating the processor in such an alternate resource-optimized configuration.

In the configuration of FIG. 8B, each of the slices can be assigned a 32-instruction instruction window (e.g., one quarter of a 128-instruction instruction window) and a portion of the load store queue resources provided for the "fully resourced model." When an instruction block containing more than 32 instructions is encountered, the instruction block can be "folded" into this window by fetching sub-blocks of an instruction block. For example, a first 32 instructions are fetched into an instruction window of a 32-instruction slice. Instructions that send data outside of these 32 instructions must have their results held until the next instruction arrives in the window and supplied as an input operand of the instruction. The processor may be further modified to include a results buffer that holds such intermediate results until they can be consumed by later instructions outside of the current instruction window.

For example, as indicated by the shading shown in FIG. 8B, a first context has been spatially allocated a portion of the instruction cache 720 ("L1 INSTRUCTION CACHE 0"), a portion of the physical register file 810 ("ARCH. REGISTER FILE 0"), an execution slice 761, including results buffer 861, a portion of the load store queue 740 ("LOAD STORE QUEUE 0", and a portion of the L1 data cache 730 ("L1 DATA CACHE 0"). A second context has been spatially allocated a different, larger portion of the resources, including a second portion of the instruction cache 720 ("L1 INSTRUCTION CACHE 1", "L1 INSTRUCTION CACHE 2"), a second portion of the physical register file 810 ("ARCH. REGISTER FILE 1", "ARCH. REGISTER FILE 2"), two execution slices 762 and 763, including results buffers 862 and 863, a second portion of the load store queue 740 ("LOAD STORE QUEUE 1," "LOAD STORE QUEUE 2"), and a second portion of the L1 data cache 730 ("L1 DATA CACHE 1", ("L1 DATA CACHE 1"). The spatially allocated portions are privately allocated such that the contexts cannot access non-allocated resources. So, for example, each of the first and second contexts has access to an exclusive, but smaller instruction cache, data cache. Switching logic, such as multiplexers, cross bars, reconfigurable logic, or other suitable technology is used to implement the reconfiguration of the processor into allocated spatial portions. It should be noted that the spatially-allocated resources are not re-allocated between contexts dynamically as in multi-threading implementations of general-purpose processors. Thus, each context is provided with independent access to its spatially allocated resources. In some examples, aspects of resources may be allocated to context. For example, a multi-ported data cache or register file may allocate a number of read or write ports to a context.

Each of the execution slices 761-764 is associated with a respective results buffer 861-864, as will be discussed in further detail below. The results buffers can be used to temporarily stored operands to be sent between portions of an instruction block.

FIG. 8C is a block diagram 820 illustrating the processor in such an alternate resource-optimized configuration. In the configuration of FIG. 8C, the L1 data cache 730 and the next-block predictor 790 are temporally allocated to the first and second contexts discussed above. For example, multiplexing and de-multiplexing logic can be configured to allow access to the first context on even clock cycles, and to the second context on odd clock cycles. Thus, the first context can read or write data to the L1 data cache 730 and receive next block predictions from the predictor 790 during even clock cycles, and the second context is provided similar access during odd clock cycles. It should be noted that finer-grain and more complex schemes can be used to temporally allocate the resources. For example, the second context may be allocated access to the temporally-allocated resources for twice as many clock cycles as the first context.

It should be further understood that processors can have spatially and temporally allocated resources provided in combination sub-combination with each other. For example, as shown in FIG. 8C, the first context is spatially allocated one-fourth of the instruction cache 720, physical register file 810, one execution slice 760, and one load-store queue 740, and is also temporally allocated access to the L1 data cache 730 and next-block predictor 790. The second context is spatially allocated one-half of the respective resources, and is also temporally allocated access to the data cache and next block predictor.

XI. Example Block Folding Using a Results Buffer

Figure 9:
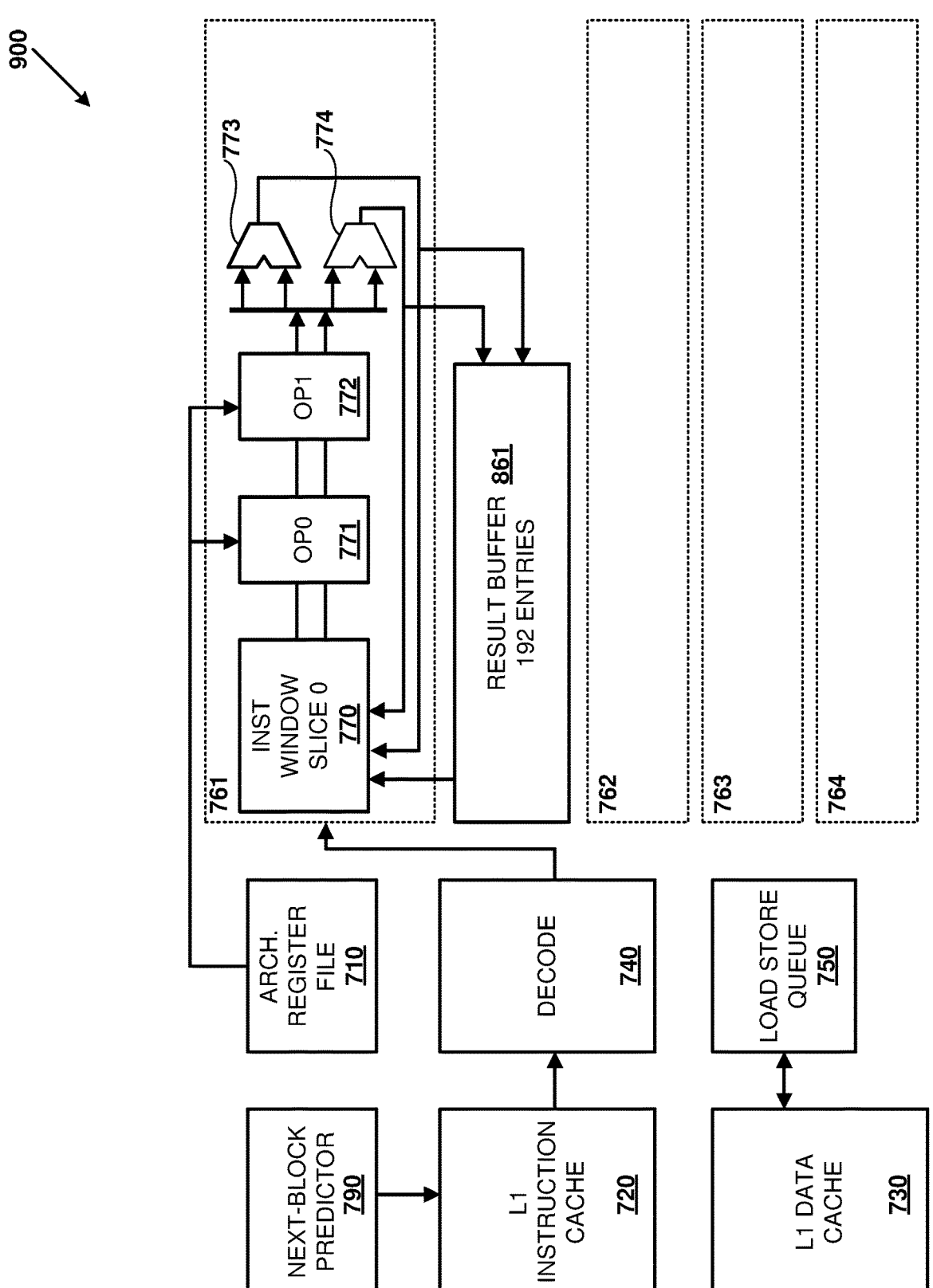
FIG. 9 is a block diagram illustrating an example processor configurable to use a results buffer, as can be used in certain examples of the disclosed technology.

FIG. 9 is a block diagram 900 outlining an example of a processor slice within the microarchitecture detailed above in FIG. 7 and FIGS. 8A-8C, including further details of using results buffers (e.g. buffers 861-864), that can be used in certain examples of the disclosed technology.

As shown in FIG. 9, the results buffer 861 has been sized to include 192 entries. This size is sufficient to hold two input operands for 96 instructions. For a 128-instruction instruction block mapped to 32 instruction windows, this is the maximum number of input operands needed to be saved, as the operands for the first three-fourths of a 128-instruction instruction block can be stored in the results buffer and then consumed by the last fourth of the instruction block. For example, as discussed above in the example of FIG. 4, the result of the instruction 460 (I[3]) is stored in the results buffer 861 until it is consumed by the instruction 465 (I[100]). In examples where predicates are shared between portions of a folded instruction block, additional entries in the results buffer 861 may be used.

In the illustrated example of FIG. 9, the results buffer can be organized as a table (e.g., with a RAM), with one result block entry dedicated to an instruction number, and the result supplied when the target instruction arrives and is ready for execution. In some examples, data stored in the results buffer includes one or more identifiers of target instructions that receive the data stored in the results buffer. In some examples, the results buffer is organized as a FIFO, and values are stored with their target instruction identifiers, which are then sent to the associated instruction in the subsequent block of instructions. It should be further noted that for instruction set architectures that send other input operands to instructions, the results buffer can be correspondingly expanded. For example, in block-based processor ISAs that include predicate instructions, predicates generated by instructions can be temporarily stored in the results buffer until consumed by later instructions at a later point in time. The illustrated results buffer 861 can store values that are then fed back to the same functional slice 761, while in other examples, the results buffer 861 stores values that are consumed by other execution slices that are mapped to subsequent portions of an instruction block.

The results buffer 861 can be implemented using any suitable technology, including registers implemented with flip-flops or latches, SRAMs, or other suitable memory technology. For example, a RAM that uses an instruction identifier as the input address can store data for target operands for the instructions at that address location in memory. The input operand can then be accessed by the targeted instruction at a later point in time.

It is possible to reduce the size of the results buffer using a number of different techniques. For example, one 32-instruction slice can generate at most 32 results, which can form targets for at most 64 operands (in the depicted example, each instruction can send its results to up to two target instructions). Thus, the first two 32 instruction sub-blocks can generate operands for the next two sub-blocks within an instruction block. In such an example, the results buffer can be sized large enough to store up to 128 results for the remaining block. In such a design, a target instruction ID is maintained with each entry, in order to resolve any ambiguity in the targeted instruction. In some examples, a compiler for generating instruction blocks can assist in reducing the results buffer size by minimizing the number of operands that are passed between instruction block portions. For example, the compiler can enforce a limit of, say, 32 operands that can be passed between portions. In some examples, the compiler may move instructions between portions in order to satisfy this limit. In some examples, the compiler may duplicate instructions in two different portions to avoid reaching an operand limit for crossing portion boundaries.

When an instruction sub-block completes and another instruction sub-block arrives, the results stored in the results buffer can be copied into the instruction's operand buffer. As will be readily understood to one of ordinary skill in the art having the benefit of the present disclosure, alternate approaches to designing and optimizing the design of the results buffer can be employed.

The load store queue 740 can be arranged in a number of different ways. For example, the load store queue need not be a 32-entry queue, but can be limited to a size of eight entries. In such an example, after each sub-block of the instruction bock completes, the entries in the queue are committed to memory and can be freed for use by subsequent sub-blocks within an instruction block. In such examples, instead of committing an entire instruction block after the entire instruction block completes, the instruction block is partially committed as it executes.

Thus, as discussed above, the disclosed technologies can improve resource utilization in processors, including BB-ISA processors. Such spatial and temporal allocation techniques can provide guaranteed per-context throughput and forward progress for each context, even when other contexts are unable to make progress. Therefore, in certain embodiments, multiple contexts can be supported with reduced control logic complexity and underutilization of resources. Further, in certain embodiments, processor and system security can be enhanced, because execution resources are allocated to specific contexts but the allocated resources are not shared with other contexts while allocated to a particular context. Thus, malicious code may be prevented access to other contexts executed by the processor.

XII. Example of Spatial and Temporal Allocation of Processor Resources

Figure 10:
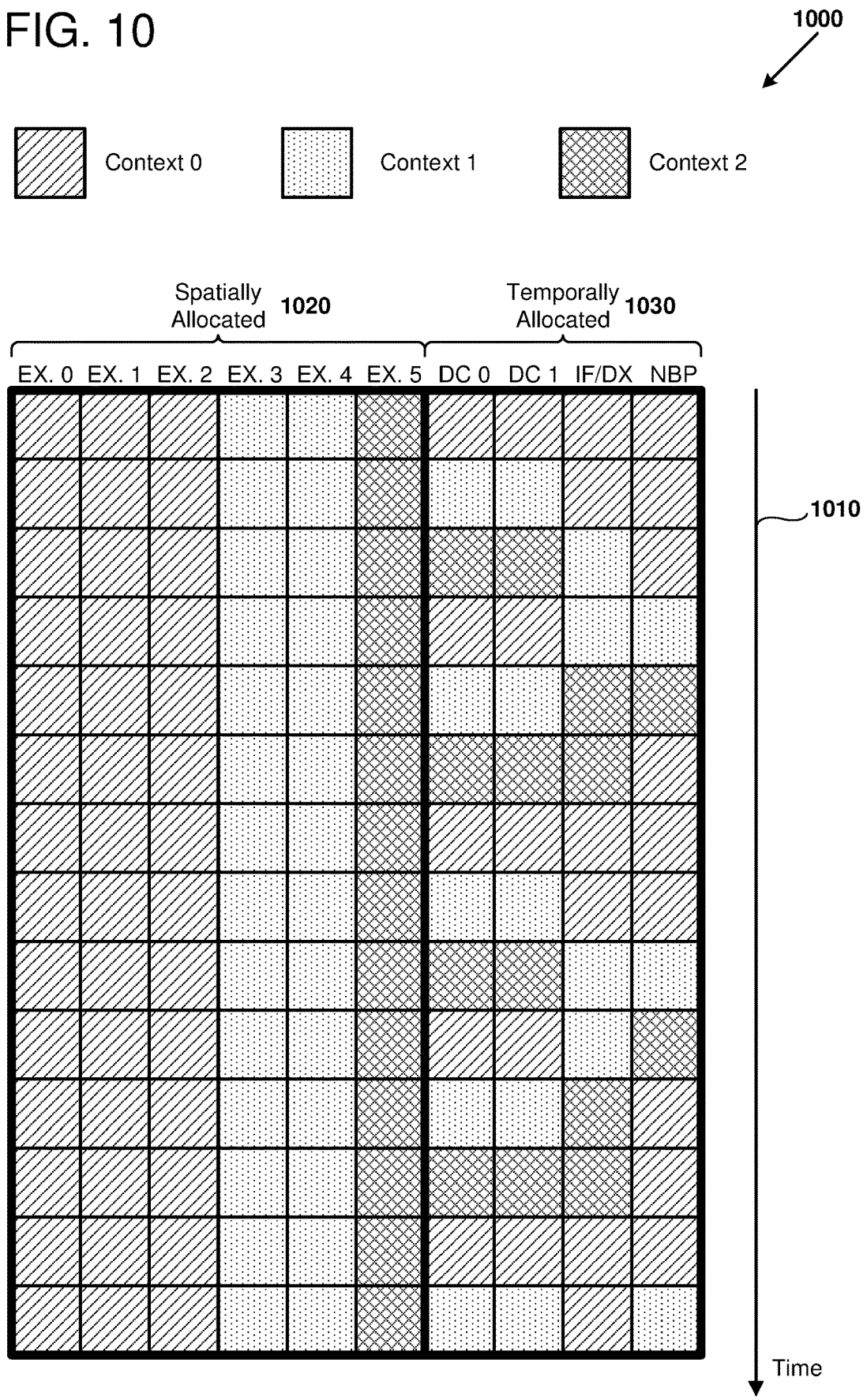
FIG. 10 is a diagram illustrating an example of spatial and temporal allocation of processor resources, as can be performed in certain examples of the disclosed technology.

FIG. 10 is a diagram 1000 illustrating an example of spatial and temporal allocation of processor resources, as can be performed in certain examples of the disclosed technology. A time axis 1010 is used to indicate the allocation of resources between three contexts, context 0, context 1, and context 2, in a block based processor configured according to the disclosed technology.

As shown in FIG. 10, a set of six execution slices are spatially allocated 1020 between the three contexts. Context 0 is spatially allocated three execution slices, labeled EX. 0, EX. 1, and EX. 2. Context 1 is allocated to two execution slices, labeled EX.3 and EX.4. Context 2 is allocated a single execution slice, labeled EX. 5. As shown in FIG. 10, each of the contexts is spatially allocated to the respective execution slices for the entirety of the illustrated time period. Thus, individual contexts do not compete for the spatially allocated resources.

Temporal allocation 1030 of resources between the three contexts is also illustrated in FIG. 10. Two data caches, labeled DC 0, DC 1 are shown being temporally allocated between the three contexts on a per clock cycle basis. Thus, context 0 can access DC 0 and DC 1 every third clock cycle, while context 1 accesses DC 0 and DC 1 on the subsequent clock cycle, etc. Resources may also be allocated for multiple clock cycles. For example, an instruction fetch/instruction decoder unit, labeled IF/DX is allocated to context 0 for a first two clock cycles, to context 1 for a second two clock cycles, and to context 2 for a third set of two clock cycles. Allocation of a next block predictor, labeled NBP is also shown. The next block predictor NBP is not temporally allocated equally between contexts. As shown, context 0 receives access to the next block predictor NBP for three clock cycles, while the other two contexts (1 and 2) receive access to the NBP for a single clock cycle. Such an allocation may be performed if, for example, the work flow of a context uses more branches, has smaller instruction blocks, or otherwise requires the use of branch prediction more often than other contexts. However, it should be noted that the illustrated temporal allocations are fixed for each of the contexts and thus, each of the contexts is guaranteed at least a portion of the temporally allocated resources.

Figure 11:
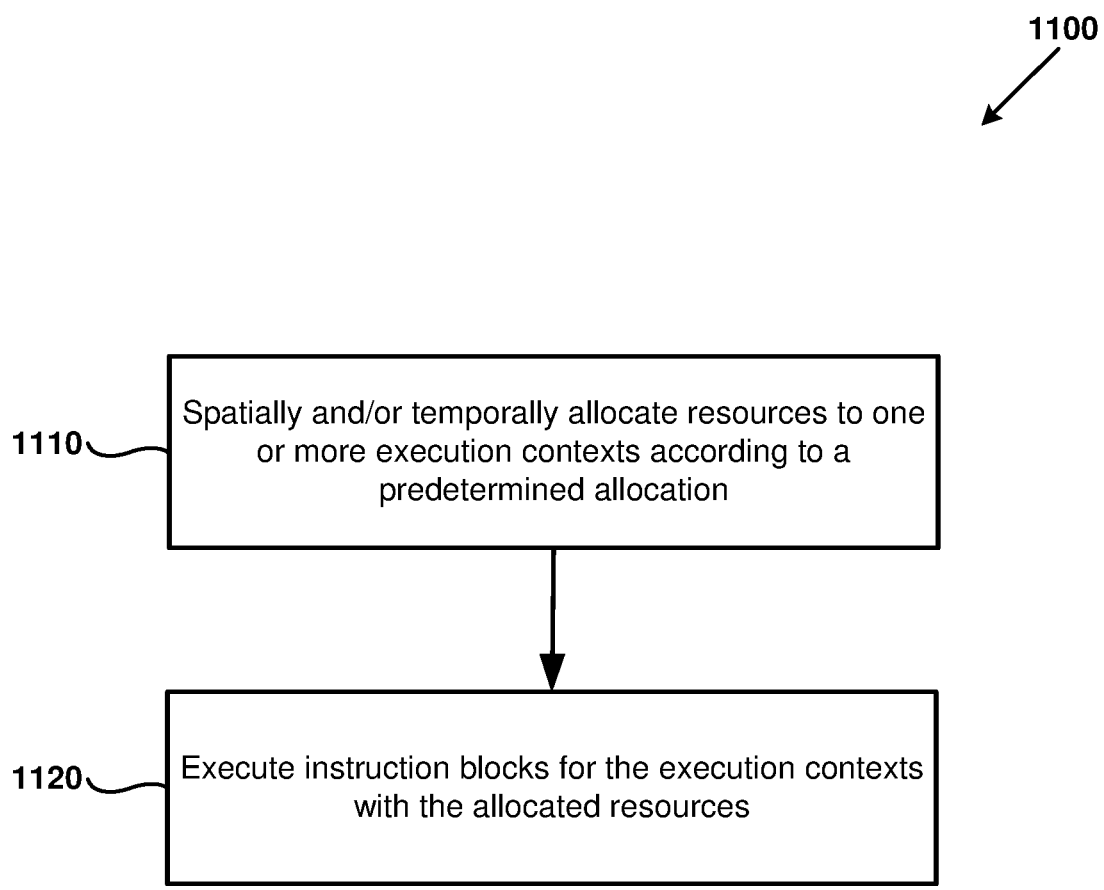
FIG. 11 is a flowchart outlining an example of allocating resources and executing instruction blocks, as can be performed in certain examples of the disclosed technology.

XIII. Example Method of Spatial and Temporal Allocation of Processor Resources FIG. 11 is a flowchart 1100 outlining an example of allocating resources and executing instruction blocks, as can be performed in certain examples of the disclosed technology.

At process block 1110, resources are spatially and/or temporally allocated to one or more execution contexts according to a predetermined allocation. For example, spatially allocated resources can include portions of an instruction cache, an instruction window, a functional unit, a data cache, or a register file. The spatially allocated resources need not be allocated evenly, but some contexts can be allocated more resources, including more execution slices, than other contexts. The temporally allocated resources can include a branch predictor, data cache, or other suitable resources. It should be noted that the allocations are predetermined in that the manner in which the resources are spatially and/or temporally allocated does not depend on current processor load or status. Thus, each context can be guaranteed a certain amount of resources for executing a given context.

At process block 1120, instruction blocks for the execution contexts are executed with the allocated resources. For example, instruction windows allocated to a given context can track operands and other processor state while the given context is in operation. Further, instruction blocks for a context can access temporally allocated resources according to, for example, a per clock cycle allocation.

XIV. Example Method of Resource Allocating Using a Results Buffer

Figure 12:
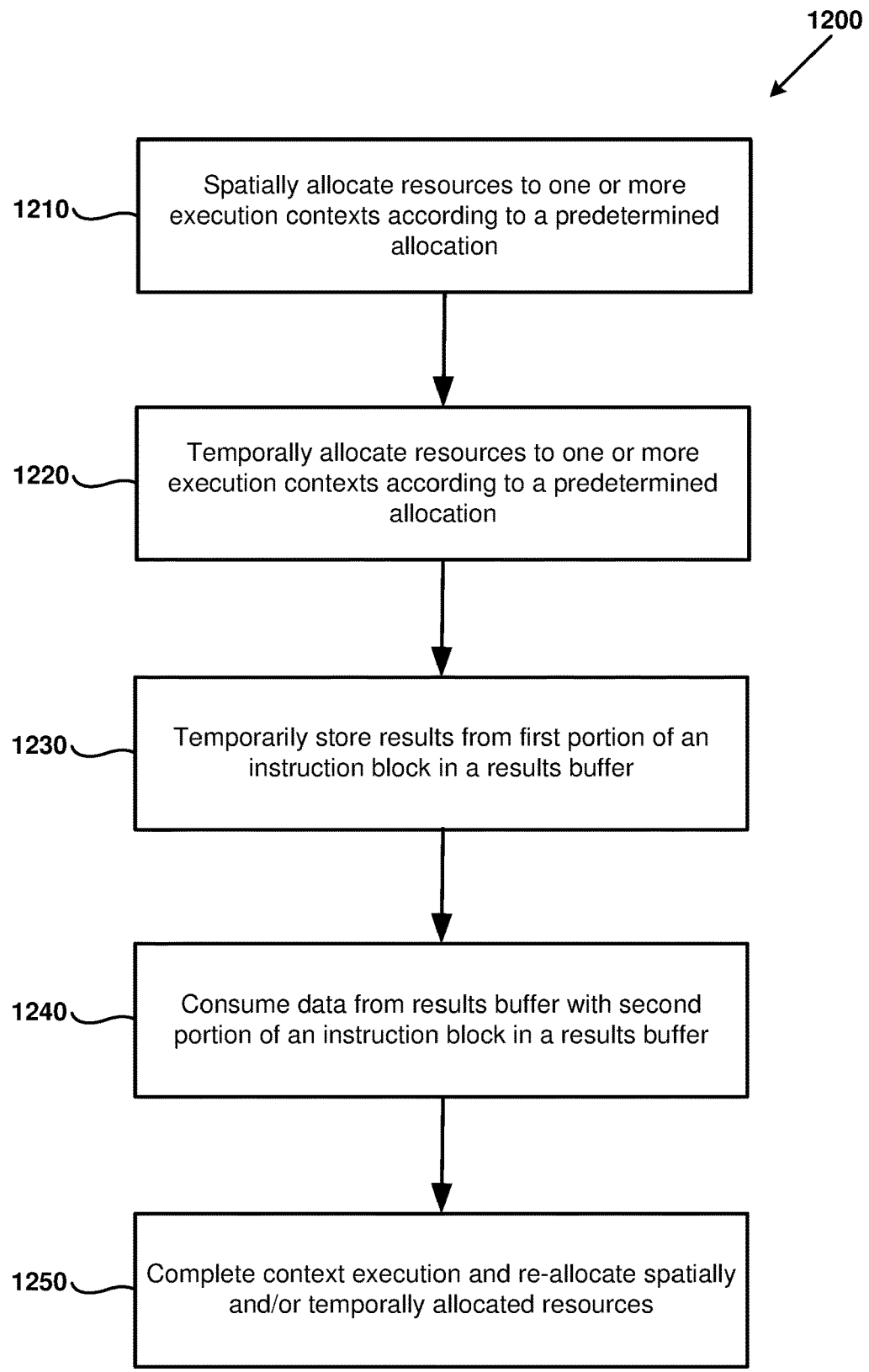
FIG. 12 is a flowchart outlining an example of executing instruction blocks using spatially and/or temporally allocated resources including the use of a results buffer

FIG. 12 is a flowchart 1200 outlining an example of executing instruction blocks using spatially and/or temporally allocated resources including the use of a results buffer, as can be performed in certain examples of the disclosed technology.

At process block 1210, resources are spatially allocated to one or more execution contexts according to a predetermined allocation.

At process block 1220, resources are temporally allocated to one or more execution context according to a predetermined allocation. Thus, it should be noted that certain resources of a processor may be spatially allocated, while other resources are temporally allocated to a context. In some examples, the processor may support spatial or temporal allocation of the same resource. For example, data cache may be configurable to be spatially allocated, and then re-configured in order to be temporally allocated to context executing on the processor.

At process block 1230, results generated from a first portion of an instruction block are stored temporarily in a results buffer. For example, a 128-instruction instruction block can be divided into four 32 instruction portions. Results from a first portion of the instruction block can be temporarily stored until they are consumed by instructions in another portion of the instruction block.

At process block 1240, data is consumed from the results buffer with the second portion of the instruction block from the results buffer. For example, a subsequent portion of an instruction block can access a results buffer to receive instruction operands for particular instructions within that second portion. The subsequent instruction block can be executed using the same functional slice, or a different functional slice, as the current instruction block, depending on the processor configuration.

At process block 1250, execution of a given context is completed, and its resources that were spatially and/or temporally allocated can be reallocated to other contexts.

XV. Example Computing Environment

Figure 13:
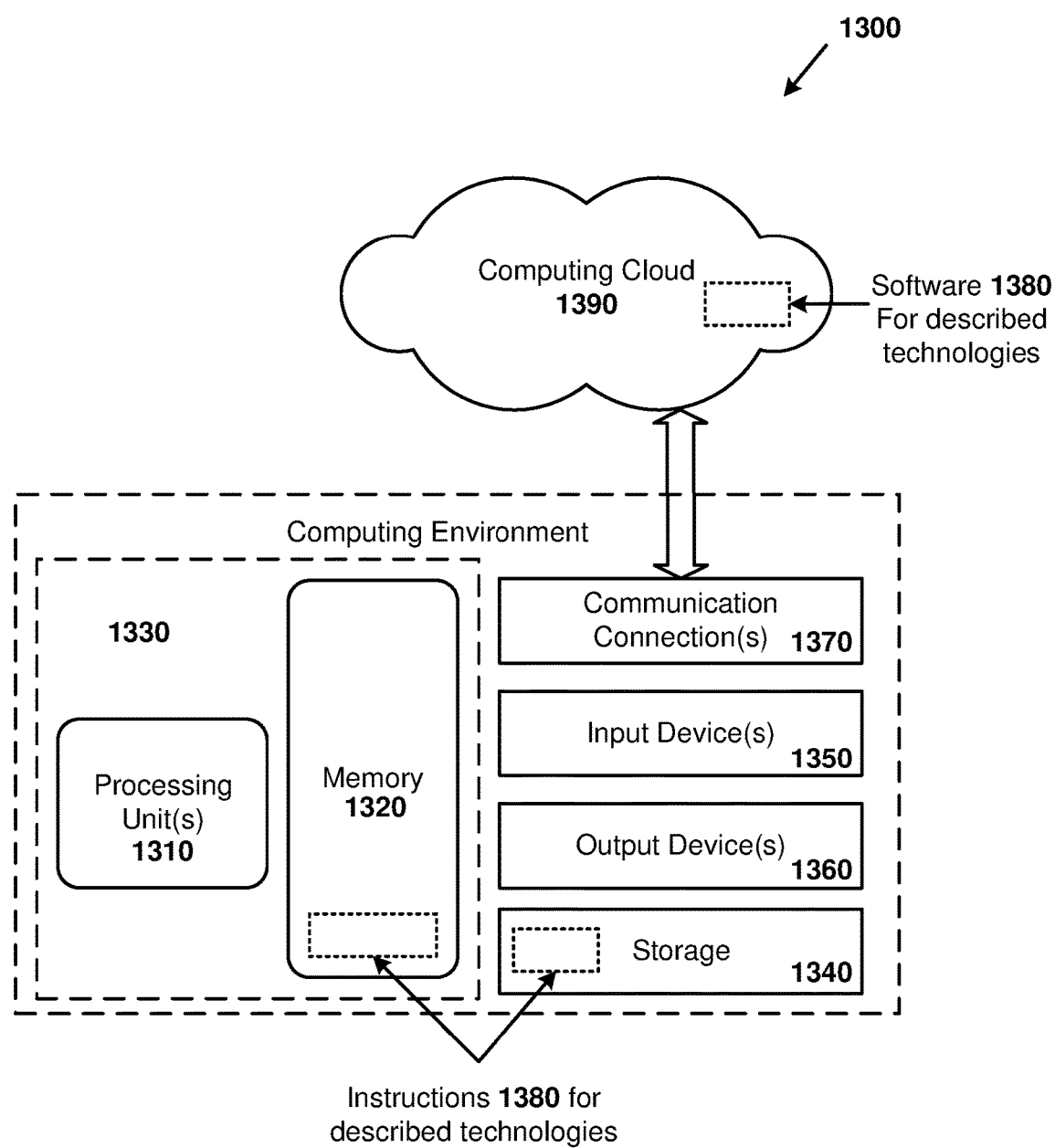
FIG. 13 is a block diagram illustrating a suitable computing environment for implementing some embodiments of the disclosed technology.

FIG. 13 illustrates a generalized example of a suitable computing environment 1300 in which described embodiments, techniques, and technologies, including allocating resources for executing an instruction block targeted for a block-based processor, can be implemented.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 13, the computing environment 1300 includes at least one block-based processing unit 1310 and memory 1320. In FIG. 13, this most basic configuration 1330 is included within a dashed line. The block-based processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, be used with implementations of technologies described herein. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, plugin data, and messages, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, disclosed compilers and/or block-based-processor servers are located in the computing environment 1330, or the disclosed compilers can be executed on servers located in the computing cloud 1390. In some examples, the disclosed compilers execute on traditional central processing units (e.g., RISC or CISC processors).

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals.

XVI. Additional Examples of the Disclosed Technology

Additional examples of the disclosed subject matter are discussed herein in accordance with the examples discussed above.

In some examples of the disclosed technology, a processor is configurable to spatially allocate a set of execution resources according to two or more modes. The modes include a first mode where the processor is configured to spatially allocate a first portion of the set of execution resources to a first context and to spatially allocate a different, second portion of the set of execution resources to a second context, the respective first and second portions not being shared between the first context and the second contexts while the contexts are active. The processor can be a CISC, RISC, block-based, or EDGE ISA processor. The processor can be implemented in any suitable manufacturing technology, including as a custom integrated circuit, an ASIC, an SoC, an FPGA, or other suitable logic implementation technology.

In some examples, the processor includes a second mode where the processor is configured to spatially re-allocate all of the set of execution resources to a single context. In some examples, the processor includes a third mode where the processor is configured to spatially re-allocate a portion but not all of the set of execution resources to a single context and to not allocate the remaining portion of the set of execution resources. In some examples, execution resources are allocated equally between contexts. In some examples, execution resources are allocated un-equally between contexts. The context includes the architectural state data describing state for a process or thread hosted by the processor.

Architectural state data associated with an individual context for a process or thread can include priority information for the associated process or thread, scheduling information for the associated process or thread, child/parent process information, interprocess communication data, privilege information, state information, identifiers for the process or thread, architectural register file values, instruction block address pointers, individual instruction pointers within an instruction block, memory management information, or other suitable information associated with a process or thread.

In some examples, the allocated set of execution resources comprises at least one or more of the following: an instruction window, a functional unit, a data cache, an instruction cache, a results buffer, a load/store queue, and/or a physical register file. In some examples the set of spatially allocated execution resources is first set, and there is a second set of execution resources of the processer temporally allocated to the first context and the second context. In some examples, the second set of temporally allocated set of execution resources comprises at least one or more of the following: a branch predictor, an instruction cache, a load/store queue, and/or a data cache. In some examples, one or more execution resources are allocated on a spatial basis, and the spatially-allocated execution resources are sub-allocated on a temporal basis.

In some examples, the first portion of the set of execution resources includes a results buffer, the results buffer being configured to communicate operands for an atomic instruction block from a first slice of the first portion of execution resources to a second slice of the first portion of execution resources.

In some examples of the disclosed technology, a processor according to any of the disclosed ISAs includes a set of execution resources configured to execute processor instructions for two or more execution contexts, a control unit configured to: spatially allocate a first portion of the set of resource between the two or more execution contexts, and to temporally allocate a different, second portion of the set of execution resources between the two or more execution contexts. The first portion and the second portion of allocated resources are determined prior to performing execution of at least one of the two or more execution contexts. For example, when a thread or process is initiated, resources can be spatially, temporally, or spatially and temporally allocated to the thread or process being initiated.

In some examples, the set of execution resources includes at least one or more of the following: a branch predictor, a data cache, an instruction cache, or an instruction decoder.

In some examples, the set of execution resources are allocated to a respective one of the execution contexts on a clock cycle basis. For example, every one out of n clock cycles can be allocated for accessing a temporally allocated resources. In some examples, the temporal allocation is evenly distributed between contexts, while in other examples, the allocation is not even. In some examples, the set of execution resources is allocated (spatially and/or temporally) to a respective one of the execution contexts based on predicted demand for the set of resources. In some examples, the set of execution resources are allocated (spatially and/or temporally) to a respective one of the execution contexts based on information encoded in an instruction block by a compiler. In some examples, a profiler generates data indicating projected resource demand and the allocation is based at least in part on the profiler-generated data.

In some examples of the disclosed technology the processor is a block-based processor configured to spatially, temporally, or spatially and temporally allocate various execution resources between one or more contexts according to any of the examples disclosed herein. The set of execution resources includes a temporally allocated branch predictor that generates a prediction of a next instruction block address based on one or more of the following inputs: a target block address, whether one or more branch instructions in an instruction block were taken or not taken, a source instruction block address, and/or an identifier for an execution context.

In some examples of the disclosed technology the processor is a block-based processor configured to spatially, temporally, or spatially and temporally allocate various execution resources between one or more contexts according to any of the examples disclosed herein. each of the execution contexts comprises architectural state data for a thread or a process comprising atomic blocks of two or more processor instructions.

In some examples of the disclosed technology, method of operating a block-based processor includes allocating execution resources of the block-based processor to one or more execution contexts of the processor according to a predetermined allocation, and executing instructions blocks for the execution contexts with the allocated execution resources. The allocation of individual resources can be on a spatial and or temporal resource. For example, spatially allocated resources according to exemplary methods disclosed herein can include one or more of the following: an instruction window, a functional unit, a data cache, an instruction cache, a results buffer, a load/store queue, and/or a physical register file. As a further example, temporally allocated resources can include one or more of the following: a branch predictor, an instruction cache, a load/store queue, or a data cache. In some examples, one or more execution resources are allocated on a spatial basis, and the spatially-allocated execution resources are sub-allocated on a temporal basis.

In some examples, the method uses the predetermined allocation that is a spatial assignment of the execution resources to each of the execution contexts. In some examples, the predetermined allocation is a temporal assignment the execution resources to each of the execution contexts. In some examples, the method further includes re-allocating the execution resources, wherein the execution resources are not re-allocated until the context completes, pauses, or halts execution. For example, after a thread or process associated with a context is terminated, paused, or put in a wait or sleep state, the execution resources allocated to the context can be re-allocated to a different context (e.g., a new or concurrently executing process or thread) for execution. In some examples, the number of functional slices and portions of other allocated execution resources remains the same, while in other examples, the amount of functional resources is increased or decreased for the new context.

In some examples the predetermined allocation provided to a context by the method is not based on runtime stalling of the execution contexts. The predetermined allocation can be made based on a predetermined assignment of resources, by hints or specifications in an instruction block or other data generated by a compiler, by hints or data generated by a runtime profiler, or by other suitable techniques.

In some examples of the disclosed technology, the predetermined allocation is selected to spatially assign a first portion of the execution resources to each of the execution contexts, and the predetermined allocation is selected to temporally assigns a disjoint, second portion of the execution resources to each of the execution contexts.

In some examples, the method further includes, for a first one of the execution contexts temporarily storing data generated by a first portion of the first execution context's execution resources in a results buffer, and sending the temporarily stored data from the results buffer to a second portion of the first execution context's execution resources in a results buffer.

One or more computer-readable storage media may store computer-readable instructions that when executed by a computer cause the computer to perform any of the methods of temporal and/or spatial allocation disclosed herein. A block-based processor may be configured to execute computer-readable instructions generated by the method.

In some examples of the disclosed technology, a compiler and/or profiler are used to at least partially determine how resources are spatially and/or temporally allocated. For example, a compiler or profiler can determine that instruction blocks for a particular context are likely to require more or fewer execution resources and generate data indicated how execution resources for the processor should be spatially and/or temporally allocated. In some examples, the compiler can order individual instructions within an instruction block to allow for reduced operand passing between portions of the instruction block. This can reduce the overhead required, or meet resource constraints, when using a results buffer to temporarily store data operands and/or predicate operands passed between portions of a folded instruction block. For example, by moving a source instruction or target instruction to be located within a portion that receives or generates the respective instruction operand data, fewer storage elements in the results buffer may be used.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims and their equivalents.

We claim:

1. A processor configurable to spatially allocate a first set of execution resources and a second set of execution resources according to two or more modes, the modes comprising:
   a first mode wherein the processor is configured to spatially allocate a first portion of the first set of execution resources to a first context and to spatially allocate a different, second portion of the first set of execution resources to a second context, the respective first and second portions not being shared between the first context and the second contexts while the contexts are active, the second set of execution resources being temporally allocated nonconsecutively between the first context and the second context according to a predetermined allocation on a fixed, per-clock cycle basis, the second set of execution resources comprising at least one of the following: a branch predictor, an instruction cache, or a data cache.

2. The processor of claim 1, wherein the modes further comprise:
   a second mode wherein the processor is configured to spatially re-allocate all of the set of execution resources to a single context.

3. The processor of claim 1, wherein the modes further comprise:
   a third mode wherein the processor is configured to spatially re-allocate a portion but not all of the second set of execution resources to a single context and to not allocate a remaining portion of the set of execution resources.

4. The processor of claim 1, wherein the allocated second set of execution resources comprises at least one or more of the following: an instruction window, a functional unit, a data cache, an instruction cache, a results buffer, or a physical register file.

5. The processor of claim 1, wherein the first portion of the set of execution resources comprises a results buffer, the results buffer being configured to communicate operands for an atomic instruction block from a first slice of the first portion of execution resources to a second slice of the first portion of execution resources.

6. The processor of claim 1, wherein the second set of execution resources comprises a branch predictor but does not comprise an instruction cache or a data cache.

7. The processor of claim 1, wherein at least one of the second set of execution resources is not temporally allocated equally between the contexts.

8. A processor comprising:
   a set of execution resources configured to execute processor instructions for two or more execution contexts; and
   a control unit configured to:

spatially allocate a first portion of the set of execution resources between the two or more execution contexts, and temporally allocate a different, second portion of the set of execution resources between the two or more execution contexts on a fixed, per-clock cycle basis, wherein at least one of the second set of execution resources is not temporally allocated consecutively between the contexts, and wherein the first portion and the second portion are determined prior to initiating execution of at least one of the two or more execution contexts so as to avoid runtime stalling of the execution contexts.

9. The processor of claim 8, wherein the first portion of the set of execution resources comprises at least one of the following: a branch predictor, a data cache, an instruction cache, or an instruction decoder.

10. The processor of claim 8, wherein the set of execution resources are allocated to a respective one of the execution contexts on a clock cycle basis.

11. The processor of claim 8, wherein the set of execution resources are allocated to a respective one of the execution contexts based on predicted demand for the set of resources.

12. The processor of claim 8, wherein:
the processor is a block-based processor; and
the set of execution resources comprises a branch predictor that generates a prediction of a next instruction block address based on one or more of the following inputs:
a target block address,
whether a branch was taken or not taken,
a source block address, or
an identifier for an execution context.

13. The processor of claim 8, wherein:
the processor is a block-based processor; and
each of the execution contexts comprises architectural state data for a thread or a process comprising atomic blocks of two or more processor instructions.

14. The processor of claim 8, wherein the second portion of the set of execution resources comprises a branch predictor or an instruction decoder but does not comprise an instruction cache or a data cache.

15. The processor of claim 8, wherein instructions for the first context and instructions for the second context are executed according to a dataflow order without any register renaming.

16. A method of operating a processor, the method comprising:
temporally allocating execution resources of the processor to two or more execution contexts of the processor according to a predetermined allocation on a fixed, per-clock cycle basis, the allocating comprising temporally allocating the execution resources to a first one of the execution contexts for a first set of predetermined nonconsecutive clock cycles and temporally allocating the execution resources to a second one of the execution contexts for a different, second set of predetermined nonconsecutive clock cycles, the temporally allocated execution resources comprising a branch predictor; and
executing instructions for the execution contexts with the allocated execution resources,
wherein the predetermined allocation is not based on runtime stalling of the execution contexts.

17. The method of claim 16, wherein:
the predetermined allocation is a spatial assignment of the execution resources to each of the execution contexts.

18. The method of claim 16, further comprising:
re-allocating the execution resources, wherein the execution resources are not re-allocated until the context completes execution.

19. The method of claim 16, further comprising:
the predetermined allocation spatially assigns a first portion of the execution resources to each of the execution contexts; and
the predetermined allocation temporally assigns a disjoint, second portion of the execution resources to each of the execution contexts.

20. The method of claim 16, further comprising, for a first one of the execution contexts:
temporarily storing data generated by a first portion of the first execution context's execution resources in a results buffer; and
sending the temporarily stored data from the results buffer to a second portion of the first execution context's execution resources in a results buffer.

* * * * *